(12) United States Patent
Ni et al.

(10) Patent No.: US 12,506,864 B2
(45) Date of Patent: Dec. 23, 2025

(54) BLOCK-BASED REFERENCE SAMPLE INTERPOLATION FILTER OPTIMIZATION FOR VIDEO

(71) Applicant: Samsung Electronics Co., Ltd., Suwon-si (KR)

(72) Inventors: Saifeng Ni, Santa Clara, CA (US); Madhukar Budagavi, Plano, TX (US); Rajan Laxman Joshi, San Diego, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 184 days.

(21) Appl. No.: 18/545,264

(22) Filed: Dec. 19, 2023

(65) Prior Publication Data

US 2025/0113026 A1 Apr. 3, 2025

Related U.S. Application Data

(60) Provisional application No. 63/542,027, filed on Oct. 2, 2023.

(51) Int. Cl.
*H04N 7/12* (2006.01)
*H04N 19/105* (2014.01)
*H04N 19/117* (2014.01)
*H04N 19/132* (2014.01)
*H04N 19/136* (2014.01)
*H04N 19/172* (2014.01)
*H04N 19/176* (2014.01)
*H04N 19/50* (2014.01)
*H04N 19/80* (2014.01)

(52) U.S. Cl.
CPC ......... *H04N 19/117* (2014.11); *H04N 19/105* (2014.11); *H04N 19/132* (2014.11); *H04N 19/136* (2014.11); *H04N 19/172* (2014.11); *H04N 19/176* (2014.11); *H04N 19/50* (2014.11); *H04N 19/80* (2014.11)

(58) Field of Classification Search
CPC ................................................. H04N 19/132
See application file for complete search history.

(56) References Cited

PUBLICATIONS

Pfaff, et al., "Intra Prediction and Mode Coding in VVC," IEEE Transactions on Circuits and Systems for Video Technology, vol. 31, No. 10, Oct. 2021, pp. 3834-3847.

*Primary Examiner* — Y Lee

(57) ABSTRACT

An apparatus includes a communication interface configured to receive a bitstream for a compressed video and a processor operably coupled to the communication interface. The processor is configured to decode the bitstream for the compressed video and obtain reference samples associated with a block of a video frame. The processor is also configured to determine an interpolation filter type for use in obtaining predicted samples. The processor is also configured to select an interpolation filter of the interpolation filter type based on a block size of the block of the video frame. The processor is also configured to apply the interpolation filter to the reference samples. The processor is also configured to output one or more predicted samples using the interpolated reference samples.

20 Claims, 9 Drawing Sheets

BLOCK-BASED REFERENCE SAMPLE INTERPOLATION FILTER OPTIMIZATION FOR VIDEO

CROSS-REFERENCE TO RELATED APPLICATION AND PRIORITY CLAIM

This application claims priority under 35 U.S.C. § 119(e) to U.S. Provisional Patent Application No. 63/542,027 filed on Oct. 2, 2023, which is hereby incorporated by reference in its entirety.

TECHNICAL FIELD

This disclosure relates generally to multimedia devices and processes. More specifically, this disclosure relates to block-based reference sample interpolation filter optimization for video.

BACKGROUND

Intra prediction in video coding exploits spatial correlation within a picture or within a picture region. For example, in order to improve coding efficiency, the High-Efficiency Video Coding (HEVC) standard and Versatile Video Coding (VVC) standard exploit block-based spatial prediction. In VVC, multiple intra prediction modes are used to exploit spatial features. Intra prediction in video coding standards such as Advanced Video Coding (AVC) and HEVC consist of predicting the samples in the current block from already reconstructed left and top neighboring samples, referred to as reference samples. VVC also includes angular intra prediction, but, in comparison to HEVC, VVC can increase the prediction accuracy by enlarging the number of angular prediction directions and also by using more accurate interpolation filters. However, in the current VVC standard, the same set of interpolation filters are used for all blocks, even though each block can have its own unique features. Thus, current interpolation filtering tends to be inefficient.

SUMMARY

This disclosure provides block-based reference sample interpolation filter optimization for video.

In a first embodiment, an apparatus includes a communication interface configured to receive a bitstream for a compressed video and a processor operably coupled to the communication interface. The processor is configured to decode the bitstream for the compressed video and obtain reference samples associated with a block of a video frame. The processor is also configured to determine an interpolation filter type for use in obtaining predicted samples. The processor is also configured to select an interpolation filter of the interpolation filter type based on a block size of the block of the video frame. The processor is also configured to apply the interpolation filter to the reference samples. The processor is also configured to output one or more predicted samples using the interpolated reference samples.

In a second embodiment, a method includes receiving a bitstream for a compressed video. The method also includes decoding the bitstream for the compressed video and obtaining reference samples associated with a block of a video frame. The method also includes determining an interpolation filter type for use in obtaining predicted samples. The method also includes selecting an interpolation filter of the interpolation filter type based on a block size of the block of the video frame. The method also includes applying the interpolation filter to the reference samples. The method also includes outputting one or more predicted samples using the interpolated reference samples.

In a third embodiment, an apparatus includes a communication interface and a processor operably coupled to the communication interface. The processor is configured to subdivide a video frame into a plurality of blocks of a plurality of block sizes. The processor is also configured to obtain reference samples associated with a block of the plurality of blocks. The processor is also configured to determine an interpolation filter type for use in obtaining predicted samples. The processor is also configured to select an interpolation filter of the interpolation filter type based on the block size of the block. The processor is also configured to apply the interpolation filter to the reference samples. The processor is also configured to determine one or more predicted samples using the interpolated reference samples. The processor is also configured to transmit an encoded prediction residual as part of a bitstream, wherein the prediction residual is a difference between an original block and a predicted block.

In a fourth embodiment, a method includes subdividing a video frame into a plurality of blocks of a plurality of block sizes. The method also includes obtaining reference samples associated with a block of the plurality of blocks. The method also includes determining an interpolation filter type for use in obtaining predicted samples. The method also includes selecting an interpolation filter of the interpolation filter type based on the block size of the block. The method also includes applying the interpolation filter to the reference samples. The method also includes determining one or more predicted samples using the interpolated reference samples. The method also includes transmitting an encoded prediction residual as part of a bitstream, wherein the prediction residual is a difference between an original block and a predicted block.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system, or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C"

includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
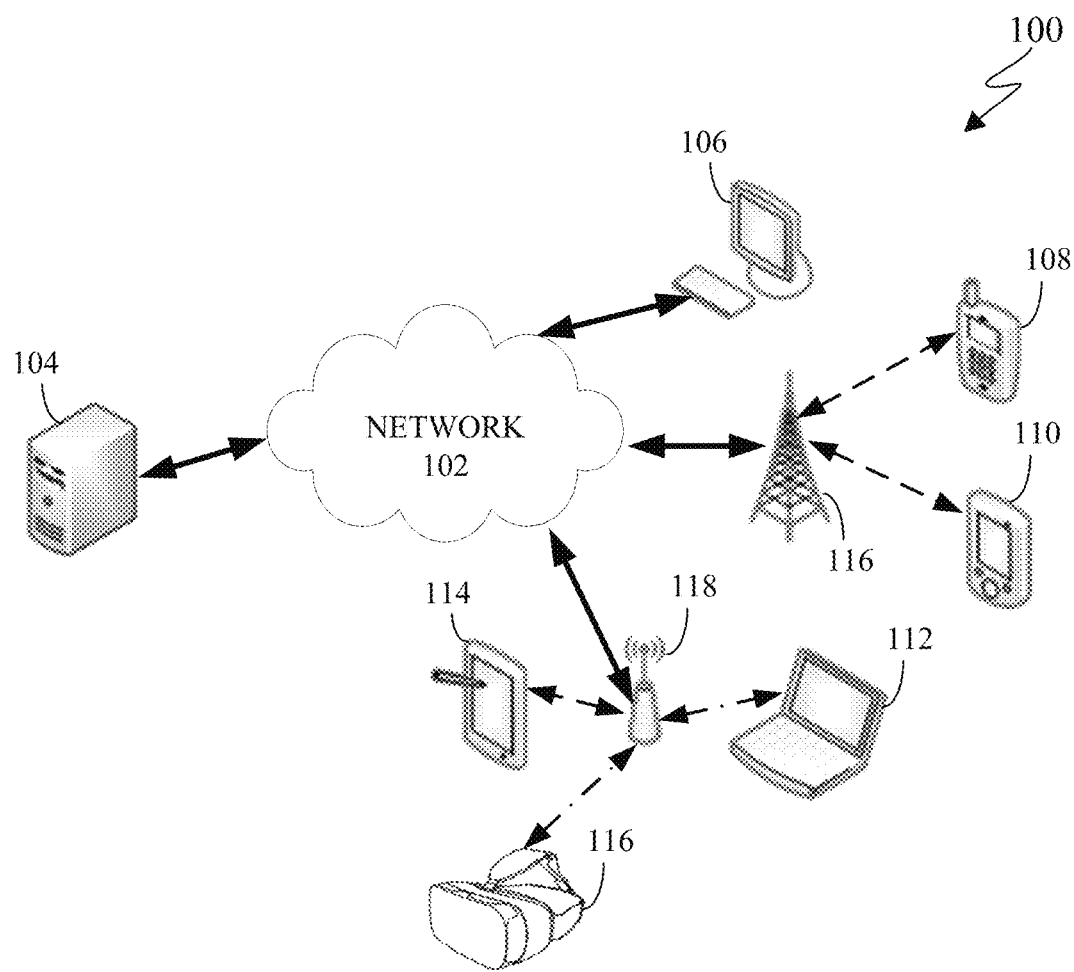
FIG. 1 illustrates an example communication system in accordance with this disclosure.

FIGS. 1 through 9, described below, and the various embodiments used to describe the principles of the present disclosure are by way of illustration only and should not be construed in any way to limit the scope of the disclosure. Those skilled in the art will understand that the principles of the present disclosure may be implemented in any type of suitably arranged device or system.

As noted above, intra prediction in video coding exploits spatial correlation within a picture or within a picture region. For example, in order to improve coding efficiency, the High-Efficiency Video Coding (HEVC) standard and Versatile Video Coding (VVC) standard exploit block-based spatial prediction. In VVC, multiple intra prediction modes are used to exploit spatial features. Intra prediction in video coding standards such as Advanced Video Coding (AVC) and HEVC consist of predicting the samples in the current block from already reconstructed left and top neighboring samples, referred to as reference samples. VVC also includes angular intra prediction, but, in comparison to HEVC, VVC can increase the prediction accuracy by enlarging the number of angular prediction directions and also by using more accurate interpolation filters. However, in the current VVC standard, the same set of interpolation filters are used for all blocks, even though each block can have its own unique features. Thus, current interpolation filtering tends to be inefficient.

In VVC, the number of directional modes was increased from 33 (in HEVC) to 65 with block shape-adaptive directions. The size of a Prediction Unit (PU) for intra prediction coding can be 1×16, 1×32, 2×8, 2×16, 2×32, 4×4, 4×8, 4×16, 4×32, 8×8, 8×16, 8×32, 16×16, 16×32, 16×64, 32×32, 64×64. VVC can also use a partitioning framework by introducing wide-angular intra prediction modes which can deal with blocks with rectangular shape, where more prediction directions are assigned to the longer side of a block. The additional modes on the longer side are called Wide-Angle Intra Prediction (WAIP) mode.

Similar to HEVC, intra prediction in VVC has two filtering mechanisms applied on reference samples, including reference sample smoothing and interpolation filtering. Reference sample smoothing is applied only to integer-slope mode for luma blocks while interpolation filtering is applied on fractional-slope mode. As described in this disclosure, 4-tap interpolation filters can be used for luma blocks. In some embodiments of this disclosure, the 4-tap interpolation filter can be a discrete cosine transform (DCT)-based interpolation filter (DCTIF) or a 4-tap smoothing interpolation filter (SIF).

As noted above, the partitioning framework in VVC leads to more block sizes in intra coding comparing to HEVC. Each block has its unique features, which may benefit from a different interpolation filter to get a better prediction in the intra angular mode. However, in the current VVC standard, the same set of 32-pel DCTIF and SIF are used for all blocks, regardless of the block features. This disclosure provides for customization and optimization of the interpolation filters, such as DCTIF and SIF filters, used in reference sample interpolation based on block features. As described in this disclosure, the customization and optimization of the interpolation filters leads to substantially improved coding efficiency.

In embodiments of this disclosure, block size features can be learned with a data-driven approach to optimize the interpolation filters for each block size accordingly. Customizing and optimizing the interpolation filters using a block size-based reference sample interpolation approach improves the coding efficiency. For example, it has been found that a coding efficiency gain of −0.11% (Y), −0.05% (U), −0.12% (V) can be achieved for the YUV color format. In some embodiments, the interpolation filters can be further customized based on other block features and/or information, such as video resolution.

FIG. 1 illustrates an example communication system 100 in accordance with this disclosure. The embodiment of the communication system 100 shown in FIG. 1 is for illustration only. Other embodiments of the communication system 100 can be used without departing from the scope of this disclosure.

As shown in FIG. 1, the communication system 100 includes a network 102 that facilitates communication between various components in the communication system 100. For example, the network 102 can communicate IP packets, frame relay frames, Asynchronous Transfer Mode (ATM) cells, or other information between network addresses. The network 102 includes one or more local area networks (LANs), metropolitan area networks (MANs), wide area networks (WANs), all or a portion of a global network such as the Internet, or any other communication system or systems at one or more locations.

In this example, the network 102 facilitates communications between a server 104 and various client devices 106-116. The client devices 106-116 may be, for example, a smartphone, a tablet computer, a laptop, a personal computer, a TV, an interactive display, a wearable device, a HMD, or the like. The server 104 can represent one or more servers. Each server 104 includes any suitable computing or processing device that can provide computing services for one or more client devices, such as the client devices 106-116. Each server 104 could, for example, include one or more processing devices, one or more memories storing instructions and data, and one or more network interfaces facilitating communication over the network 102. As described in more detail below, the server 104 can transmit a compressed bitstream, representing a compressed video to one or more display devices, such as a client device 106-116. In certain embodiments, each server 104 can include an encoder. In certain embodiments, the server 104 can perform compression/decompression and signaling of video and of information related to block intra prediction, such as including a prediction residual in the bitstream, as described in this disclosure.

Each client device 106-116 represents any suitable computing or processing device that interacts with at least one server (such as the server 104) or other computing device(s) over the network 102. The client devices 106-116 include a desktop computer 106, a mobile telephone or mobile device 108 (such as a smartphone), a PDA 110, a laptop computer 112, a tablet computer 114, and an HMD 116. However, any other or additional client devices could be used in the communication system 100. Smartphones represent a class of mobile devices 108 that are handheld devices with mobile operating systems and integrated mobile broadband cellular network connections for voice, short message service (SMS), and Internet data communications. The HMD 116 can display 360° scenes including video. In certain embodiments, any of the client devices 106-116 can include an encoder, decoder, or both. For example, the mobile device 108 can record a video and then encode the video enabling the video to be transmitted to one of the client devices 106-116. In another example, the laptop computer 112 can be used to generate video data, which is then encoded and transmitted to one of the client devices 106-116.

In this example, some client devices 108-116 communicate indirectly with the network 102. For example, the mobile device 108 and PDA 110 communicate via one or more base stations 118, such as cellular base stations or eNodeBs (eNBs). Also, the laptop computer 112, the tablet computer 114, and the HMD 116 communicate via one or more wireless access points 120, such as IEEE 802.11 wireless access points. Note that these are for illustration only and that each client device 106-116 could communicate directly with the network 102 or indirectly with the network 102 via any suitable intermediate device(s) or network(s). In certain embodiments, the server 104 or any client device 106-116 can be used to compress video data, generate a bitstream that represents the video data, and transmit the bitstream to another client device such as any client device 106-116.

In certain embodiments, any of the client devices 106-114 transmit information securely and efficiently to another device, such as, for example, the server 104. Also, any of the client devices 106-116 can trigger the information transmission between itself and the server 104. Any of the client devices 106-114 can function as a VR display when attached to a headset via brackets, and function similar to HMD 116. For example, the mobile device 108 when attached to a bracket system and worn over the eyes of a user can function similarly as the HMD 116. The mobile device 108 (or any other client device 106-116) can trigger the information transmission between itself and the server 104.

In certain embodiments, any of the client devices 106-116 or the server 104 can create video data, compress video data, transmit video data, receive video data, decode video data, render video data, perform intra prediction, or a combination thereof. For example, the server 104 can compress a video to generate a bitstream and then transmit the bitstream to one or more of the client devices 106-116. As another example, one of the client devices 106-116 can compress a video to generate a bitstream and then transmit the bitstream to another one of the client devices 106-116 or to the server 104. In accordance with this disclosure, the server 104 and/or the client devices 106-116 can perform compression/decompression of video, including performing intra prediction using customized and/or optimized interpolation filters and related signaling as described in this disclosure.

Although FIG. 1 illustrates one example of a communication system 100, various changes can be made to FIG. 1. For example, the communication system 100 could include any number of each component in any suitable arrangement. In general, computing and communication systems come in a wide variety of configurations, and FIG. 1 does not limit the scope of this disclosure to any particular configuration. While FIG. 1 illustrates one operational environment in which various features disclosed in this patent document can be used, these features could be used in any other suitable system.

Figure 2:
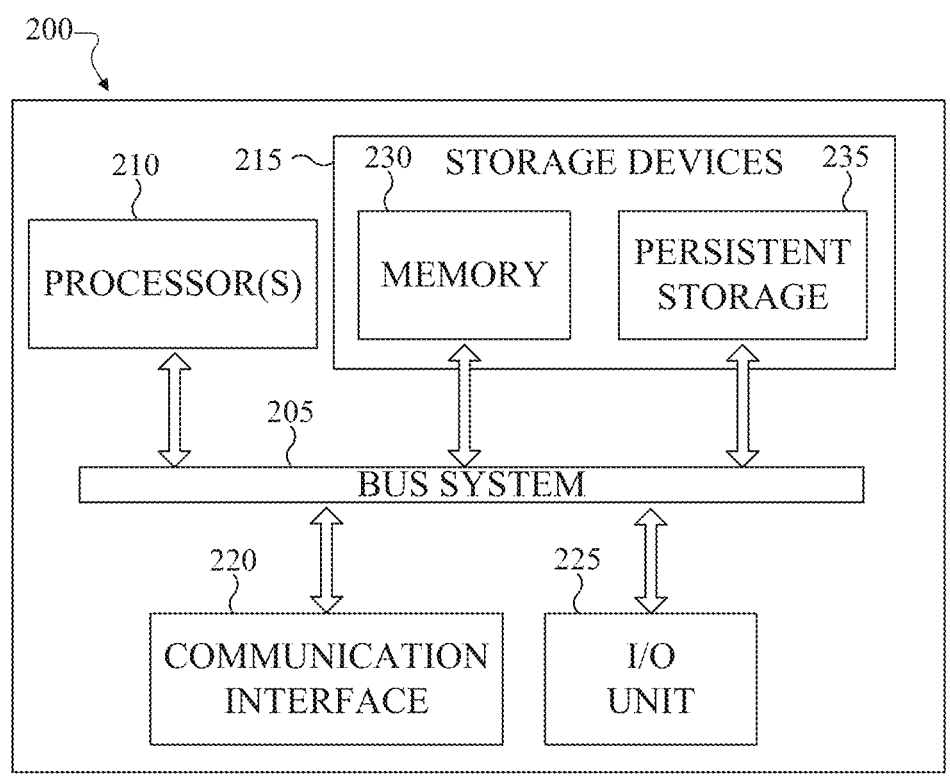
FIGS. 2 and 3 illustrate example electronic devices in accordance with this disclosure.
Figure 3:
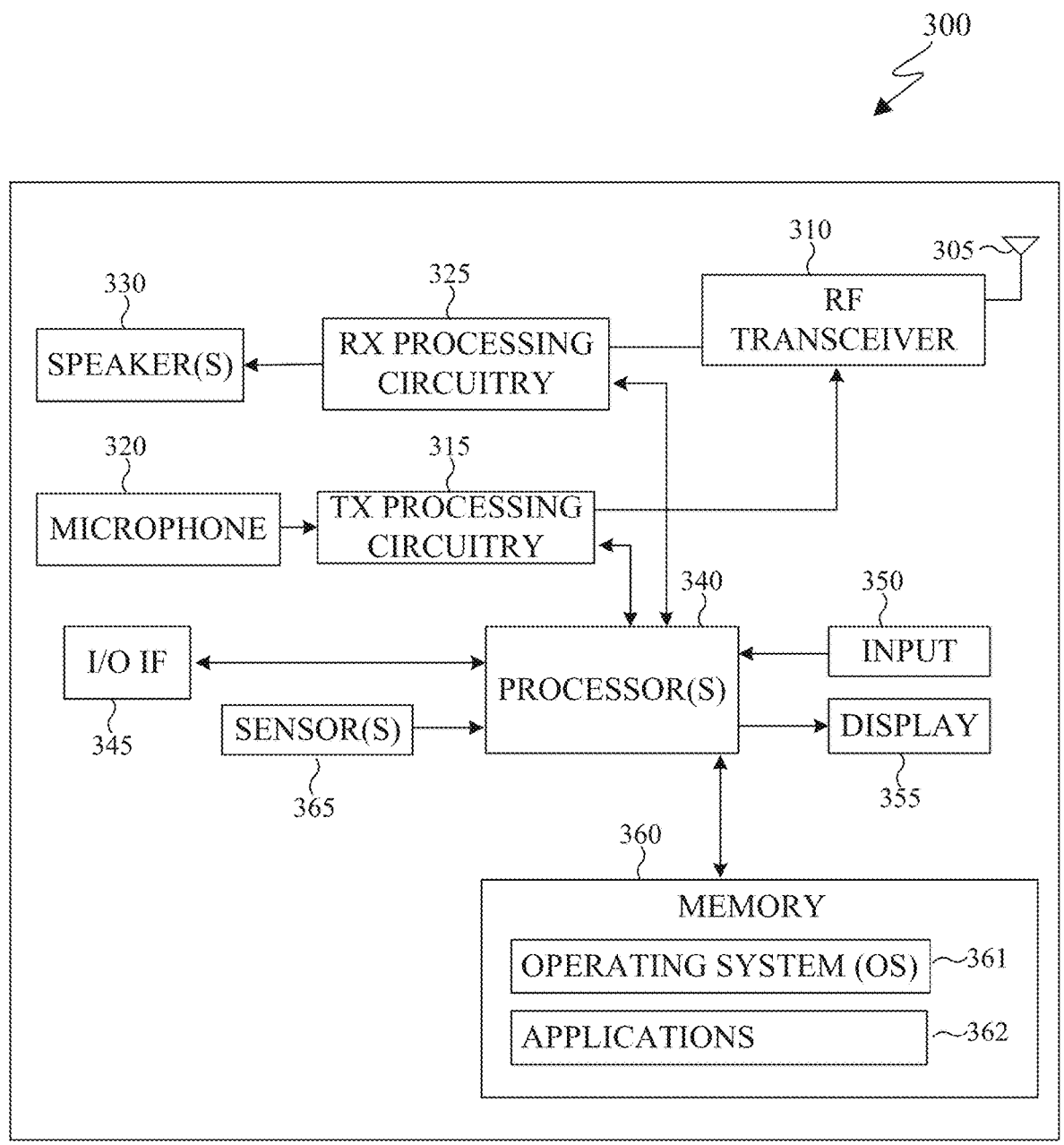

FIGS. 2 and 3 illustrate example electronic devices in accordance with this disclosure. In particular, FIG. 2 illustrates an example server 200, and the server 200 could represent the server 104 in FIG. 1. The server 200 can represent one or more encoders, decoders, local servers, remote servers, clustered computers, and components that act as a single pool of seamless resources, a cloud-based server, and the like. The server 200 can be accessed by one or more of the client devices 106-116 of FIG. 1 or another server.

As shown in FIG. 2, the server 200 can represent one or more local servers, one or more compression servers, or one or more encoding servers, such as an encoder. In certain embodiments, the encoder can perform decoding. As shown in FIG. 2, the server 200 includes a bus system 205 that supports communication between at least one processing device (such as a processor 210), at least one storage device 215, at least one communications interface 220, and at least one input/output (I/O) unit 225.

The processor 210 executes instructions that can be stored in a memory 230. The processor 210 can include any suitable number(s) and type(s) of processors or other devices in any suitable arrangement. Example types of processors 210 include microprocessors, microcontrollers, digital signal processors, field programmable gate arrays, application specific integrated circuits, and discrete circuitry.

In certain embodiments, the processor 210 can encode video stored within the storage devices 215, including performing block-based intra prediction using customized and/or optimized interpolation filters. In certain embodiments, encoding video can include subdividing a video frame into a plurality of blocks of a plurality of block sizes, obtaining reference samples associated with a block of the plurality of blocks, determining an interpolation filter type for use in obtaining predicted samples, selecting an interpolation filter of the interpolation filter type based on the block size of the block, applying the interpolation filter to the reference samples, determining one or more predicted samples using the interpolated reference samples, and transmitting an encoded prediction residual as part of a bitstream. A prediction residual represents a difference between an original block and a predicted block. In certain embodiments, the processor 210 can perform such compression/decompression and signaling of the video and information for intra prediction as described in this disclosure.

The memory 230 and a persistent storage 235 are examples of storage devices 215 that represent any structure(s) capable of storing and facilitating retrieval of information (such as data, program code, or other suitable information on a temporary or permanent basis). The memory 230 can represent a random access memory or any other suitable volatile or non-volatile storage device(s). For example, the instructions stored in the memory 230 can include instructions for performing block-based intra prediction using customized and/or optimized interpolation filters, instructions for compressing 2D video frames, as well as instructions for encoding 2D video frames in a certain order in order to generate a bitstream. The instructions stored in the memory 230 can also include instructions for rendering the video as viewed through a VR headset, such as HMD 116 of FIG. 1. The instructions stored in the memory 230 can also include instructions for compression/decompression and signaling of video as described in this disclosure. The persistent storage 235 can contain one or more components or devices supporting longer-term storage of data, such as a read only memory, hard drive, Flash memory, or optical disc.

The communications interface 220 supports communications with other systems or devices. For example, the communications interface 220 could include a network interface card or a wireless transceiver facilitating communications over the network 102 of FIG. 1. The communications interface 220 can support communications through any suitable physical or wireless communication link(s). For example, the communications interface 220 can transmit a bitstream containing video to another device such as one of the client devices 106-116.

The I/O unit 225 allows for input and output of data. For example, the I/O unit 225 can provide a connection for user input through a keyboard, mouse, keypad, touchscreen, or other suitable input device. The I/O unit 225 can also send output to a display, printer, or other suitable output device. Note, however, that the I/O unit 225 can be omitted, such as when I/O interactions with the server 200 occur via a network connection.

Note that while FIG. 2 is described as representing the server 104 of FIG. 1, the same or similar structure could be used in one or more of the various client devices 106-116. For example, a desktop computer 106 or a laptop computer 112 could have the same or similar structure as that shown in FIG. 2.

FIG. 3 illustrates an example electronic device 300, and the electronic device 300 could represent one or more of the client devices 106-116 in FIG. 1. The electronic device 300 can be a mobile communication device, such as, for example, a mobile station, a subscriber station, a wireless terminal, a desktop computer (similar to the desktop computer 106 of FIG. 1), a portable electronic device (similar to the mobile device 108, the PDA 110, the laptop computer 112, the tablet computer 114, or the HMD 116 of FIG. 1), and the like. In certain embodiments, one or more of the client devices 106-116 of FIG. 1 can include the same or similar configuration as the electronic device 300. In certain embodiments, the electronic device 300 is an encoder, a decoder, or both. For example, the electronic device 300 is usable with data transfer, image or video compression, image or video decompression, encoding, decoding, and media rendering applications.

As shown in FIG. 3, the electronic device 300 includes an antenna 305, a radio-frequency (RF) transceiver 310, transmit (TX) processing circuitry 315, a microphone 320, and receive (RX) processing circuitry 325. The RF transceiver 310 can include, for example, a RF transceiver, a BLUETOOTH transceiver, a WI-FI transceiver, a ZIGBEE transceiver, an infrared transceiver, and various other wireless communication signals. The electronic device 300 also includes a speaker 330, a processor 340, an input/output (I/O) interface (IF) 345, an input 350, a display 355, a memory 360, and a sensor(s) 365. The memory 360 includes an operating system (OS) 361, and one or more applications 362.

The RF transceiver 310 receives from the antenna 305, an incoming RF signal transmitted from an access point (such as a base station, WI-FI router, or BLUETOOTH device) or other device of the network 102 (such as a WI-FI, BLUETOOTH, cellular, 5G, LTE, LTE-A, WiMAX, or any other type of wireless network). The RF transceiver 310 down-converts the incoming RF signal to generate an intermediate frequency or baseband signal. The intermediate frequency or baseband signal is sent to the RX processing circuitry 325 that generates a processed baseband signal by filtering, decoding, and/or digitizing the baseband or intermediate frequency signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data from the processor 340. The outgoing baseband data can include web data, e-mail, or interactive video game data. The TX processing circuitry 315 encodes, multiplexes, and/or digitizes the outgoing baseband data to generate a processed baseband or intermediate frequency signal. The RF transceiver 310 receives the outgoing processed baseband or intermediate frequency signal from the TX processing circuitry 315 and up-converts the baseband or intermediate frequency signal to an RF signal that is transmitted via the antenna 305.

The processor 340 can include one or more processors or other processing devices. The processor 340 can execute instructions that are stored in the memory 360, such as the OS 361 in order to control the overall operation of the electronic device 300. For example, the processor 340 could control the reception of forward channel signals and the transmission of reverse channel signals by the RF transceiver 310, the RX processing circuitry 325, and the TX processing circuitry 315 in accordance with well-known principles. The processor 340 can include any suitable number(s) and type(s) of processors or other devices in any suitable arrangement. For example, in certain embodiments, the processor 340 includes at least one microprocessor or microcontroller. Example types of processor 340 include microprocessors, microcontrollers, digital signal processors, field programmable gate arrays, application specific integrated circuits, and discrete circuitry.

The processor 340 is also capable of executing other processes and programs resident in the memory 360, such as operations that receive and store data. The processor 340 can move data into or out of the memory 360 as required by an executing process. In certain embodiments, the processor 340 is configured to execute the one or more applications 362 based on the OS 361 or in response to signals received from external source(s) or an operator. Example, applications 362 can include an encoder, a decoder, a VR or AR application, a camera application (for still images and videos), a video phone call application, an email client, a social media client, a SMS messaging client, a virtual assistant, and the like. In certain embodiments, the processor 340 is configured to receive and transmit media content. In certain embodiments, the processor 340 can perform block-based intra prediction using customized and/or optimized interpolation filters, and compression/decompression and signaling of video as described in this disclosure.

The processor 340 is also coupled to the I/O interface 345 that provides the electronic device 300 with the ability to connect to other devices, such as client devices 106-114. The I/O interface 345 is the communication path between these accessories and the processor 340.

The processor 340 is also coupled to the input 350 and the display 355. The operator of the electronic device 300 can use the input 350 to enter data or inputs into the electronic device 300. The input 350 can be a keyboard, touchscreen, mouse, track ball, voice input, or other device capable of acting as a user interface to allow a user in interact with the electronic device 300. For example, the input 350 can include voice recognition processing, thereby allowing a user to input a voice command. In another example, the input 350 can include a touch panel, a (digital) pen sensor, a key, or an ultrasonic input device. The touch panel can recognize, for example, a touch input in at least one scheme, such as a capacitive scheme, a pressure sensitive scheme, an infrared scheme, or an ultrasonic scheme. The input 350 can be associated with the sensor(s) 365 and/or a camera by providing additional input to the processor 340. In certain embodiments, the sensor 365 includes one or more inertial measurement units (IMUs) (such as accelerometers, gyroscope, and magnetometer), motion sensors, optical sensors, cameras, pressure sensors, heart rate sensors, altimeter, and the like. The input 350 can also include a control circuit. In the capacitive scheme, the input 350 can recognize touch or proximity.

The display 355 can be a liquid crystal display (LCD), light-emitting diode (LED) display, organic LED (OLED), active matrix OLED (AMOLED), or other display capable of rendering text and/or graphics, such as from websites, videos, games, images, and the like. The display 355 can be sized to fit within an HMD. The display 355 can be a singular display screen or multiple display screens capable of creating a stereoscopic display. In certain embodiments, the display 355 is a heads-up display (HUD). The display 355 can also display decoded video data.

The memory 360 is coupled to the processor 340. Part of the memory 360 could include a RAM, and another part of the memory 360 could include a Flash memory or other ROM. The memory 360 can include persistent storage (not shown) that represents any structure(s) capable of storing and facilitating retrieval of information (such as data, program code, and/or other suitable information). The memory 360 can contain one or more components or devices supporting longer-term storage of data, such as a read only memory, hard drive, Flash memory, or optical disc. The memory 360 also can contain media content. The media content can include various types of media such as images, videos, three-dimensional content, VR content, AR content, 3D point clouds, meshes, volumetric multiview video, and the like.

The electronic device 300 further includes one or more sensors 365 that can meter a physical quantity or detect an activation state of the electronic device 300 and convert metered or detected information into an electrical signal. For example, the sensor 365 can include one or more buttons for touch input, a camera, a gesture sensor, an IMU sensors (such as a gyroscope or gyro sensor and an accelerometer), an eye tracking sensor, an air pressure sensor, a magnetic sensor or magnetometer, a grip sensor, a proximity sensor, a color sensor, a bio-physical sensor, a temperature/humidity sensor, an illumination sensor, an Ultraviolet (UV) sensor, an Electromyography (EMG) sensor, an Electroencephalogram (EEG) sensor, an Electrocardiogram (ECG) sensor, an IR sensor, an ultrasound sensor, an iris sensor, a fingerprint sensor, a color sensor (such as a Red Green Blue (RGB) sensor), and the like. The sensor 365 can further include control circuits for controlling any of the sensors included therein.

One or more of these sensor(s) 365 may be used to control a user interface (UI), detect UI inputs, determine the orientation and facing the direction of the user for three-dimensional content display identification, and the like. Any of these sensor(s) 365 may be located within the electronic device 300, within a secondary device operably connected to the electronic device 300, within a headset configured to hold the electronic device 300, or in a singular device where the electronic device 300 includes a headset.

The electronic device 300 can create media content such as generating a virtual object or capturing (or recording) content through a camera. The electronic device 300 can encode the media content to generate a bitstream, such that the bitstream can be transmitted directly to another electronic device or indirectly such as through the network 102 of FIG. 1. The electronic device 300 can receive a bitstream directly from another electronic device or indirectly such as through the network 102 of FIG. 1.

Although FIGS. 2 and 3 illustrate examples of electronic devices, various changes can be made to FIGS. 2 and 3. For example, various components in FIGS. 2 and 3 could be combined, further subdivided, or omitted and additional components could be added according to particular needs. As a particular example, the processor 340 could be divided into multiple processors, such as one or more central processing units (CPUs) and one or more graphics processing units (GPUs). In addition, as with computing and communication, electronic devices and servers can come in a wide variety of configurations, and FIGS. 2 and 3 do not limit this disclosure to any particular electronic device or server.

Angular intra prediction is a directional intra prediction method. In comparison to HEVC, the angular intra prediction of VVC was modified by increasing the prediction accuracy and by an adaptation to a particular partitioning framework. The former was realized by enlarging the number of angular prediction directions and by more accurate interpolation filters, while the latter was achieved by introducing wide-angular intra prediction modes. The number of directional modes in angular intra prediction can be 65 directions, such as in VVC.

During encoding, a video frame can be subdivided into a plurality of blocks of various block sizes. For blocks of square shape, an equal number of angular modes can be assigned to the top and left side of a block. For intra blocks of rectangular shape, more intra prediction directions can be assigned to the longer side of a block. The additional modes allocated along a longer side are called Wide-Angle Intra Prediction (WAIP) modes, since they correspond to prediction directions with angles greater than 45 degrees relative to the horizontal or vertical mode.

Figure 4:
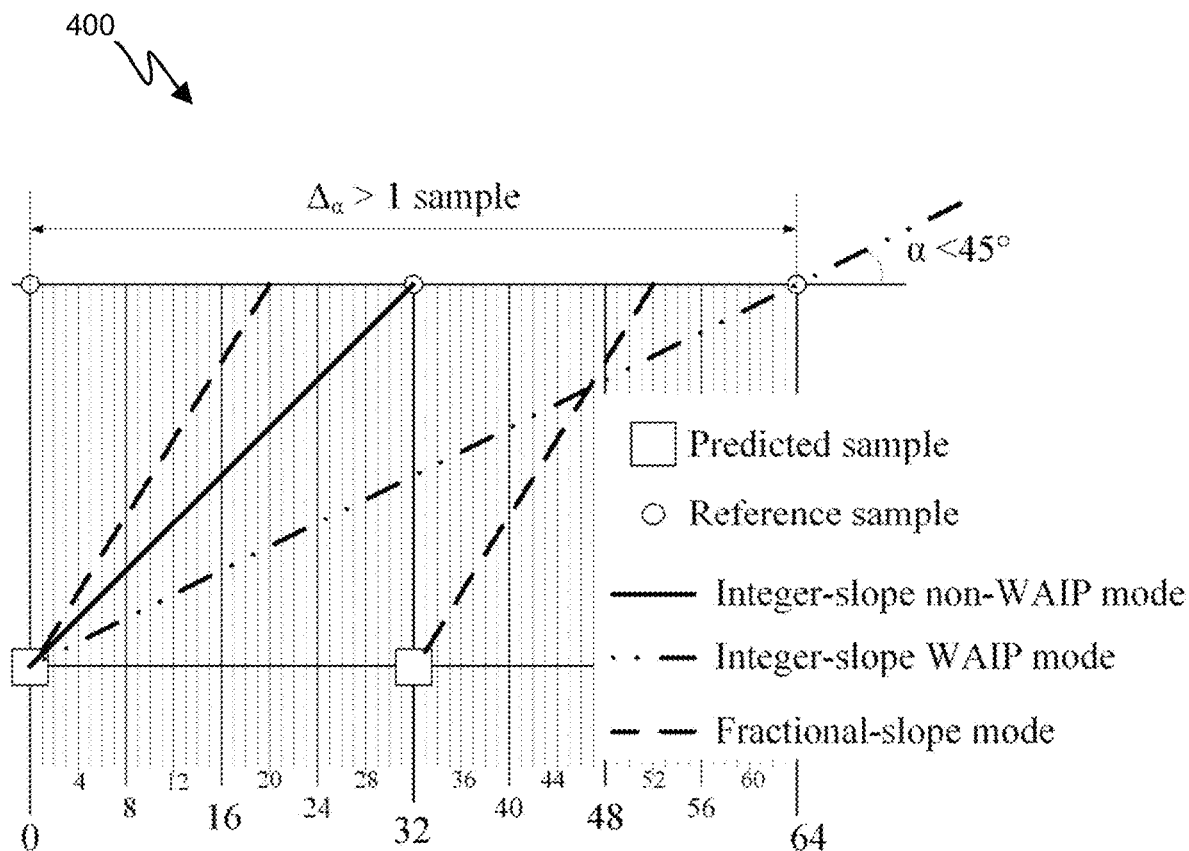
FIG. 4 illustrates example integer and fractional slope modes used for intra prediction in accordance with this disclosure.

FIG. 4 illustrates example integer and fractional slope modes 400 used for intra prediction in accordance with this disclosure. For ease of explanation, the example integer and fractional slope modes 400 may be described as being used by the electronic device 300 of FIG. 3. However, the example integer and fractional slope modes 400 may be used with any other suitable system and any other suitable electronic device. The example integer and fractional slope modes 400 illustrated in FIG. 4 are for illustration only. FIG. 4 does not limit the scope of this disclosure to any particular implementation of intra prediction modes.

As shown in FIG. 4, different modes included integer-slope non-WAIP, integer-slope WAIP, and fractional-slope modes can be used for intra prediction to determine predicted samples from reference samples. For square-shaped blocks, each pair of predicted samples that are horizontally or vertically adjacent can be predicted from a pair of adjacent reference samples. However, since WAIP extends the angular range of directional prediction beyond 45 degrees, for a coding block predicted with a WAIP mode, adjacent predicted samples may be predicted from non-adjacent reference samples. To suppress discontinuities caused by this phenomenon, the reference samples are smoothed for WAIP modes. This smoothing can be performed by either enabling reference sample filtering or by using smoothing interpolation filters.

One of these two filtering methods, reference sample smoothing and interpolation filtering, can be applied on a given block to avoid a latency increase caused by a sequential application of two filtering operations. That is, reference sample smoothing is applied to integer-slope modes in luma blocks while interpolation filtering is applied to fractional-slope modes. Reference sample smoothing can be invoked for integer-slope modes if the number of samples in the given block is more than 32. For interpolation filtering, if a sample projection for a given prediction direction falls on a fractional position between reference samples as shown in FIG. 4, the predicted sample value can be obtained by applying an interpolation filter to the reference samples around the fractional sample position.

For example, for luma blocks, 4-tap interpolation filters can be used and the predicted sample pred(x, y) can be obtained as follows.

$$pred(x, y) = \left( \sum_{i=0}^{3} f[p][i] \cdot r[i_0 - 1 + i] + 32 \right) \gg 6$$

Here, $i_0$ denotes the closest left-side integer position of a predicted sample projection within the reference samples r (deltaInt), while p∈ {0, . . . , 31} constitutes the fractional part of the predicted sample projection with respect to $i_0$ at a 1/32-pel accuracy (deltaFrac), as depicted in FIG. 4. The interpolation filter coefficients f[p][i] are signed integers whose magnitudes are stored in 6-bit precision. They can either represent a DCT-based interpolation filter (DCTIF) or a 4-tap smoothing interpolation filter (SIF). The DCTIF can be constructed in the same way as the chroma DCTIF used for motion compensation in both HEVC and VVC. The SIF can be obtained by convolving the linear 2-tap interpolation filter of HEVC with {1, 2, 1}/4 and is thus consistent with reference sample smoothing.

Although FIG. 4 illustrates example integer and fractional slope modes 400 used for intra prediction, various changes may be made to FIG. 4. For example, the number and placement of various components in FIG. 4 can vary as needed or desired. In addition, as further described in this disclosure, the interpolation filters used for non-integer slope modes can be customized and/or optimized for improved coding efficiency.

Figure 5:
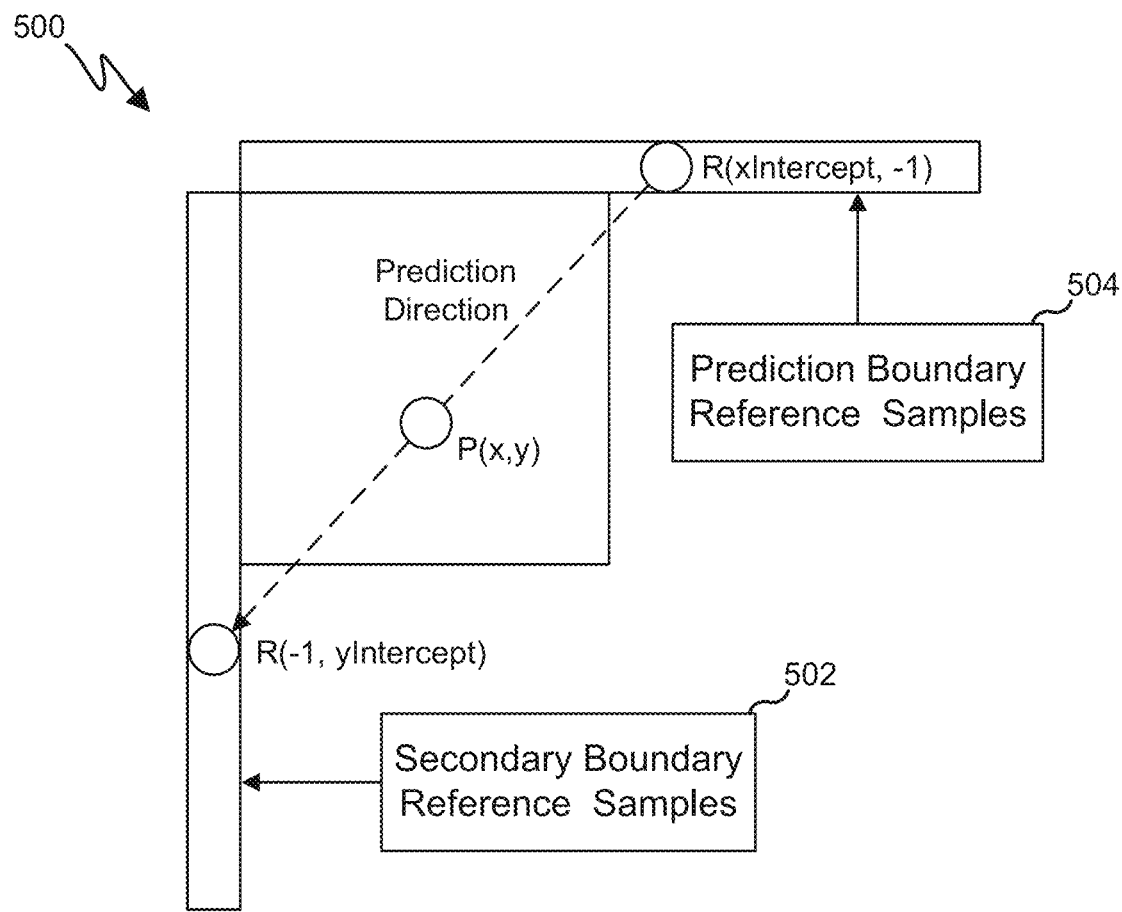
FIG. 5 illustrates an example angular position dependent prediction combination process in accordance with this disclosure.

FIG. 5 illustrates an example angular position dependent prediction combination process 500 in accordance with this disclosure. For ease of explanation, the process 500 may be described as being used by the electronic device 300 of FIG. 3. However, the process 500 may be used with any other suitable system and any other suitable electronic device. The process 500 illustrated in FIG. 5 is for illustration only. FIG. 5 does not limit the scope of this disclosure to any particular implementation of an angular position dependent prediction combination process.

After an interpolation filter is applied to the reference samples, position dependent prediction combination (PDPC) can be performed to compute an intercept with the neighboring reference samples (secondary boundary reference samples 502) that are opposite to the neighboring reference sample boundary that is used for prediction (prediction boundary reference samples 504) along the angular mode direction, as shown in FIG. 5.

As shown in FIG. 5, for an angular mode in the range 51 and above, the y-intercept with the secondary reference sample boundary 502 can be determined as follows.

$$yIntercept = y + (((x + 1) \times invAngle + 256) \gg 9),$$

$$scale = \min(2, \log_2(height) - floor(\log_2(3 \times invAngle - 2)) + 8)$$

Here, with (x, y) the coordinates of P(x, y) and invAngle are defined as the inverse of the tangent of the prediction direction angle. If scale is equal to or greater than zero, as shown in FIG. 5, the PDPC neighboring reference samples and position dependent weights can be determined as follows.

$$R_L = \left\{ \begin{array}{c} R(-1, yIntercept), \text{ if } x < (3 \ll scale), \\ 0, \text{ else} \end{array} \right\}$$

$$\omega_L = 32 \gg ((x \ll 1) \gg scale)$$

while $R_T$ and $\omega_T$ are both equal to zero. For an angular mode in the range 17 and below, the x-intercept with the secondary reference sample boundary can be computed similarly.

Intra prediction and PDPC is further described in Pfaff et al., "Intra Prediction and Mode Coding in VVC," IEEE Transactions on Circuits and Systems for Video Technology, Vol. 31, No. 10, October 2021 (available at https://ieeexplore.ieee.org/document/9400392), which is hereby incorporated by reference in its entirety.

A prediction can thus be generated using the neighboring samples and a corresponding prediction residual signal can be obtained, where the prediction residual is a difference between an original block and a predicted block. The residual can then be transformed and quantized and the transform coefficients are entropy coded and sent to the decoder. The resulting reconstructed samples can be employed to generate a next prediction. This procedure can continue until all blocks are predicted and have been coded.

Although FIG. 5 illustrates an example angular position dependent prediction combination process 500, various changes may be made to FIG. 5. For example, the number and placement of various components in FIG. 5 can vary as needed or desired. In addition, as it will be understood that multiple predictions similar to that illustrated in FIG. 5 can be performed during an encoding or decoding process.

Figure 6:
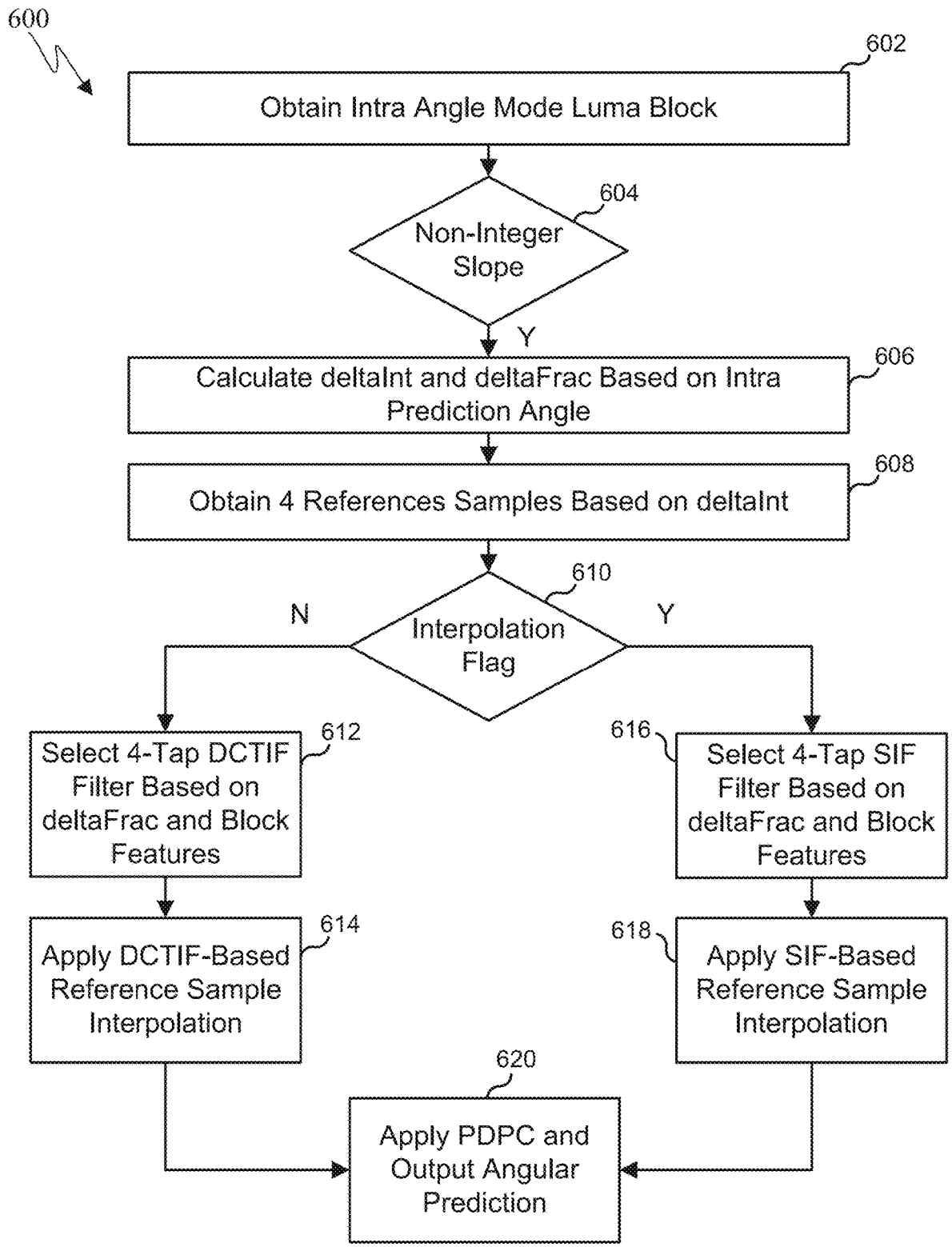
FIG. 6 illustrates an example process for block-based reference sample interpolation optimization in accordance with this disclosure.

FIG. 6 illustrates an example process 600 for block-based reference sample interpolation optimization in accordance with this disclosure. For ease of explanation, the process 600 of FIG. 6 may be described as being performed using the electronic device 300 of FIG. 3. However, the process 600 may be used with any other suitable system and any other suitable electronic device.

As shown in FIG. 6, at step 602, the electronic device 300 obtains an intra angle mode luma block. The particular block partition scheme used may split blocks into various sizes including 1×16, 1×32, 2×8, 2×16, 2×32, 4×4, 4×8, 4×16, 4×32, 8×8, 8×16, 8×32, 16×16, 16×32, 16×64, 32×32, 64×64 and some of their transpositions. Different blocks can have unique features. At step 604, the electronic device 300 determines whether the angle has a non-integer slope. If so, this indicates that a non-integer slope mode is to be used, and, at step 606, the electronic device 300 calculates deltaInt and deltaFrac based on the intra prediction angle used. As described with respect to FIG. 4, deltaInt and deltaFrac are used to determined which reference sample(s) to use for interpolation of a particular pixel, where deltaInt is the closest left-side integer position of a predicted sample projection within the reference samples, and deltaFrac is the fractional part of the predicted sample projection.

At step 608, the electronic device 300 obtains four reference samples based on the calculated deltaInt. At step 610, the electronic device 300 determines whether an interpolation flag is set to true or false (e.g., a value of 1 or 0). If the interpolation flag is false, the process 600 moves to step 612. At step 612, a 4-tap DCTIF filter is selected based on the calculated deltaFrac and block features of the luma block. At step 614, the selected DCTIF filter is applied to the reference samples to perform interpolation on the reference samples. If, at step 610, the electronic device 300 determines the interpolation flag is set to true, the process 600 moves to step 616. At step 616, a 4-tap SIF filter is selected based on the calculated deltaFrac and block features of the luma block. At step 618, the selected SIF filter is applied on the reference samples to perform interpolation on the reference samples.

Particularly, when an angular intra prediction mode is used to get the intra prediction for a block, different DCTIF or SIF filters may be used to interpolate the reference sample to get a better prediction. In various embodiments of this disclosure, the block information is utilized to customize the design of DCTIF and SIF filters used in the reference sample interpolation, instead of using the same set of 32-pel DCTIF and SIF for all the blocks as in the current standards. For example, as shown in FIG. 6, different DCTIF and SIF filters can be used for different block sizes of the blocks.

Blocks with sizes M×N and N×M are considered as the same size. In various embodiments, there can be 17 different block sizes in total used for the blocks, where, in some embodiments, SIF filters are not used for blocks with sizes 1×16, 1×32, 2×8, 2×16, 2×32, 4×4, 4×8 and 16×64. In some embodiments, instead of mathematically designing the filters for each block size, a data-driven solution can be used to optimize the DCTIF and SIF filters for each block size. For instance, the electronic device 300 can log the block size (w, h), block position (x, y), reference samples (reftop, refleft), angular mode (a), interpolation flag (i), and also PDPC related parameters (pdpc) for every block. DCTIF filters and SIF filters are modeled as 4-tap filters with 1/32 pel precision i.e., 32×4 parameters respectively, where each row is the 4-tap filter at the corresponding pel position. It will be understood that this data-driven scheme can also be generalized to other n-tap filters with 1/m pel precision, where n, m can be any number. The DCTIF filter $f_{dctif}$ or SIF filter $f_{sif}$ for a particular block can be queried according to the pel position inferred from the angular mode. The prediction for the block Y(x, y, w, h) can be calculated as p(x, y, w, h)=f(reftop, refleft, a, i, pdpc, $f_{dctif}$, $f_{sif}$). The difference between the original block and the prediction, i.e., the prediction residual, can be made smaller, where better coding gains means smaller residuals.

The electronic device 300 can use the following method to convert the residual to a loss function for the filter optimization. c(x, y, w, h)=T(Y(x, y, w, h)−p(x, y, w, h)) is the prediction residual transformed by T, where T is the two-dimensional DCT-II. The electronic device 300 uses the loss function defined on coefficients c to approximate the coding loss, l(c)=|c|+αg(β|c|−r), where g is the logistic function $$g(x) = \frac{1}{1+e^{-x}}.$$

It will be understood that other loss functions to model the prediction residual can be used as well. It has been found that this loss function can lead to better convergence than using the mean squared error (MSE) of the residual. The electronic device 300 can minimize the sum over the losses for all the blocks with the same size to search for the best DCTIF and SIF filters for each block size.

The training data set can be generated by three frames of videos including (frame id 0, 8, 16) for each block size. In some embodiments, the optimization can be implemented in Pytorch with an ADAM optimizer with a learning rate starting at 0.0005 and with a reduce factor of 1.3-1, although other implementations are possible. In some embodiments, the batch size is 64 and the number of epochs is fixed to be 30, but it will be understood that other batch sizes and numbers of epochs can be used.

An example set of SIF filter weights for different block sizes is shown in Tables 1 and 2.

TABLE 1

SIF Filters.

| 4 × 16 | 4 × 32 | 8 × 8 | 8 × 16 |
|---|---|---|---|
| 16, 32, 16, 0, | 15, 33, 18, −2, | 16, 32, 16, 0, | 16, 32, 16, 0, |
| 17, 25, 18, 4, | 19, 23, 12, 10, | 16, 32, 16, 0, | 19, 25, 17, 3, |
| 17, 26, 15, 6, | 18, 24, 18, 4, | 15, 31, 17, 1, | 15, 31, 17, 1, |
| 14, 28, 21, 1, | 15, 27, 20, 2, | 13, 29, 21, 1, | 15, 28, 20, 1, |
| 17, 23, 16, 8, | 18, 23, 16, 7, | 14, 30, 18, 2, | 18, 24, 19, 3, |
| 14, 30, 18, 2, | 15, 26, 15, 8, | 14, 30, 18, 2, | 18, 24, 18, 4, |
| 15, 25, 20, 4, | 15, 24, 20, 5, | 13, 24, 21, 6, | 15, 24, 20, 5, |
| 15, 25, 20, 4, | 14, 27, 21, 2, | 13, 29, 19, 3, | 15, 26, 20, 3, |
| 12, 28, 20, 4, | 10, 27, 21, 6, | 18, 23, 16, 7, | 16, 23, 17, 8, |
| 14, 24, 20, 6, | 14, 23, 20, 7, | 12, 24, 21, 7, | 13, 23, 21, 7, |
| 11, 26, 22, 5, | 12, 23, 22, 7, | 11, 27, 21, 5, | 13, 25, 20, 6, |
| 12, 24, 21, 7, | 14, 20, 21, 9, | 15, 24, 18, 7, | 14, 23, 20, 7, |
| 13, 22, 19, 10, | 13, 23, 19, 9, | 10, 23, 21, 10, | 12, 22, 21, 9, |
| 10, 26, 21, 7, | 7, 27, 24, 6, | 10, 26, 22, 6, | 10, 24, 22, 8, |
| 10, 24, 23, 7, | 8, 28, 21, 7, | 12, 25, 20, 7, | 11, 23, 22, 8, |
| 10, 23, 20, 11, | 9, 25, 18, 12, | 9, 22, 22, 11, | 11, 22, 21, 10, |
| 9, 23, 20, 12, | 7, 23, 24, 10, | 8, 24, 24, 8, | 10, 19, 21, 14, |

TABLE 1-continued

SIF Filters.

| 4 × 16 | 4 × 32 | 8 × 8 | 8 × 16 |
|---|---|---|---|
| 8, 24, 24, 8, | 7, 23, 26, 8, | 11, 23, 21, 9, | 9, 22, 23, 10, |
| 7, 24, 22, 11, | 9, 20, 21, 14, | 7, 22, 23, 12, | 9, 21, 22, 12, |
| 7, 23, 24, 10, | 6, 23, 23, 12, | 7, 23, 25, 9, | 7, 22, 24, 11, |
| 9, 22, 21, 12, | 9, 21, 22, 12, | 9, 22, 22, 11, | 8, 21, 23, 12, |
| 6, 21, 24, 13, | 6, 21, 25, 12, | 6, 20, 25, 13, | 8, 20, 22, 14, |
| 7, 22, 22, 13, | 7, 21, 20, 16, | 5, 21, 27, 11, | 8, 20, 21, 15, |
| 7, 22, 24, 11, | 6, 21, 25, 12, | 7, 22, 23, 12, | 6, 21, 24, 13, |
| 5, 19, 24, 16, | 7, 17, 22, 18, | 6, 17, 24, 17, | 7, 18, 23, 16, |
| 4, 21, 25, 14, | 3, 22, 25, 14, | 4, 20, 28, 12, | 5, 20, 24, 15, |
| 4, 22, 25, 13, | 4, 20, 26, 14, | 4, 22, 25, 13, | 4, 20, 25, 15, |
| 2, 19, 27, 16, | 4, 18, 24, 18, | 3, 19, 29, 13, | 4, 19, 24, 17, |
| 3, 18, 25, 18, | 4, 18, 24, 18, | 2, 18, 30, 14, | 4, 17, 24, 19, |
| 0, 22, 28, 14, | 1, 19, 29, 15, | −1, 22, 31, 12, | 0, 21, 28, 15, |
| 2, 16, 26, 20, | 3, 14, 27, 20, | 1, 17, 31, 15, | 3, 18, 24, 19, |
| 1, 17, 31, 15 | 1, 19, 25, 19 | 1, 17, 31, 15 | 3, 17, 23, 21 |

TABLE 2

SIF Filters Continued.

| 8 × 32 | 16 × 16 | 16 × 32 | 32 × 32 | 64 × 64 |
|---|---|---|---|---|
| 19, 26, 17, 2, | 20, 24, 17, 3, | 20, 24, 17, 3, | 21, 22, 17, 4, | 21, 22, 17, 4, |
| 19, 25, 18, 2, | 19, 25, 18, 2, | 20, 23, 18, 3, | 19, 24, 17, 4, | 19, 25, 15, 5, |
| 18, 25, 18, 3, | 18, 25, 18, 3, | 19, 24, 18, 3, | 19, 23, 18, 4, | 19, 24, 16, 5, |
| 16, 27, 19, 2, | 16, 27, 19, 2, | 17, 25, 18, 4, | 18, 23, 18, 5, | 18, 25, 15, 6, |
| 16, 25, 19, 4, | 16, 26, 19, 3, | 17, 24, 19, 4, | 17, 24, 18, 5, | 18, 23, 17, 6, |
| 15, 26, 19, 4, | 16, 25, 19, 4, | 16, 24, 19, 5, | 16, 24, 18, 6, | 16, 25, 16, 7, |
| 14, 26, 20, 4, | 15, 25, 20, 4, | 15, 24, 20, 5, | 16, 23, 19, 6, | 16, 24, 17, 7, |
| 14, 25, 21, 4, | 15, 24, 20, 5, | 16, 22, 20, 6, | 15, 23, 19, 7, | 16, 25, 16, 7, |
| 13, 26, 20, 5, | 13, 25, 21, 5, | 14, 24, 20, 6, | 14, 23, 20, 7, | 15, 23, 19, 7, |
| 12, 26, 21, 5, | 12, 26, 22, 4, | 13, 24, 21, 6, | 14, 22, 21, 7, | 13, 25, 18, 8, |
| 12, 25, 21, 6, | 12, 24, 22, 6, | 13, 23, 21, 7, | 13, 23, 20, 8, | 13, 24, 19, 8, |
| 12, 23, 22, 7, | 11, 25, 22, 6, | 12, 24, 21, 7, | 12, 23, 21, 8, | 12, 24, 19, 9, |
| 10, 25, 22, 7, | 10, 25, 22, 7, | 11, 24, 21, 8, | 12, 22, 21, 9, | 12, 23, 20, 9, |
| 9, 26, 22, 7, | 11, 23, 22, 8, | 11, 23, 22, 8, | 11, 23, 22, 8, | 11, 23, 20, 10, |
| 9, 24, 23, 8, | 9, 25, 23, 7, | 10, 23, 22, 9, | 10, 23, 21, 10, | 11, 23, 20, 10, |
| 10, 23, 23, 8, | 9, 24, 23, 8, | 9, 23, 22, 10, | 10, 23, 21, 10, | 10, 24, 19, 11, |
| 8, 24, 23, 9, | 8, 23, 24, 9, | 9, 23, 22, 10, | 9, 22, 22, 11, | 10, 21, 21, 12, |
| 8, 24, 23, 9, | 8, 23, 23, 10, | 9, 22, 22, 11, | 9, 22, 22, 11, | 10, 21, 21, 12, |
| 7, 23, 24, 10, | 7, 23, 24, 10, | 8, 22, 23, 11, | 8, 21, 23, 12, | 9, 21, 21, 13, |
| 6, 23, 25, 10, | 7, 22, 25, 10, | 7, 22, 23, 12, | 8, 21, 22, 13, | 8, 22, 21, 13, |
| 6, 23, 24, 11, | 6, 23, 24, 11, | 7, 22, 23, 12, | 7, 21, 23, 13, | 8, 20, 22, 14, |
| 6, 22, 24, 12, | 6, 21, 25, 12, | 7, 21, 23, 13, | 7, 21, 22, 14, | 8, 20, 22, 14, |
| 5, 21, 25, 13, | 5, 21, 26, 12, | 6, 21, 23, 14, | 6, 20, 24, 14, | 7, 20, 22, 15, |
| 4, 21, 27, 12, | 4, 22, 25, 13, | 5, 21, 24, 14, | 6, 20, 23, 15, | 6, 20, 22, 16, |
| 4, 21, 25, 14, | 4, 21, 25, 14, | 5, 21, 23, 15, | 5, 20, 23, 16, | 6, 19, 22, 17, |
| 4, 20, 25, 15, | 4, 21, 24, 15, | 5, 19, 24, 16, | 5, 19, 23, 17, | 6, 19, 22, 17, |
| 3, 20, 26, 15, | 3, 20, 25, 16, | 4, 20, 23, 17, | 5, 19, 22, 18, | 6, 18, 22, 18, |
| 3, 19, 25, 17, | 4, 19, 25, 16, | 4, 18, 24, 18, | 4, 19, 23, 18, | 5, 18, 22, 19, |
| 2, 19, 26, 17, | 3, 19, 25, 17, | 3, 19, 24, 18, | 4, 18, 23, 19, | 4, 17, 23, 20, |
| 2, 20, 26, 16, | 2, 19, 26, 17, | 3, 19, 24, 18, | 4, 18, 22, 20, | 4, 17, 23, 20, |
| 2, 18, 25, 19, | 2, 18, 25, 19, | 3, 18, 23, 20, | 3, 18, 23, 20, | 3, 18, 23, 20, |
| 2, 18, 24, 20 | 2, 18, 25, 19 | 3, 18, 22, 21 | 3, 17, 23, 21 | 3, 18, 22, 21 |

An example set of DCTIF filter weights for different block sizes is shown in Tables 3, 4, and 5.

TABLE 3

DCTIF Filters.

| 1 × 16 | 1 × 32 | 2 × 8 | 2 × 16 | 2 × 32 | 4 × 4 |
|---|---|---|---|---|---|
| 2, 60, 3, −1, | 0, 60, 6, −2, | 2, 59, 4, −1, | 1, 59, 5, −1, | 1, 60, 4, −1, | 1, 62, 2, −1, |
| −1, 62, 4, −1, | −1, 59, 9, −3, | −1, 63, 3, −1, | 0, 60, 5, −1, | −1, 60, 6, −1, | −1, 62, 4, −1, |
| −2, 61, 6, −1, | −2, 59, 10, −3, | −1, 60, 6, −1, | −1, 59, 8, −2, | −2, 60, 8, −2, | −2, 61, 6, −1, |
| −1, 58, 9, −2, | −3, 58, 12, −3, | −1, 58, 9, −2, | −2, 59, 9, −2, | −2, 58, 10, −2, | −2, 60, 8, −2, |
| −2, 58, 10, −2, | −3, 56, 14, −3, | −2, 57, 11, −2, | −2, 57, 12, −3, | −3, 57, 12, −2, | −2, 57, 11, −2, |
| −4, 58, 12, −2, | −4, 56, 16, −4, | −2, 55, 14, −3, | −3, 56, 14, −3, | −4, 57, 14, −3, | −3, 57, 12, −2, |

TABLE 3-continued

DCTIF Filters.

| 1 × 16 | 1 × 32 | 2 × 8 | 2 × 16 | 2 × 32 | 4 × 4 |
|---|---|---|---|---|---|
| −3, 55, 15, −3, | −5, 55, 18, −4, | −3, 55, 15, −3, | −4, 55, 16, −3, | −5, 56, 16, −3, | −4, 56, 15, −3, |
| −5, 56, 16, −3, | −5, 53, 20, −4, | −4, 55, 16, −3, | −4, 53, 18, −3, | −5, 54, 18, −3, | −3, 53, 19, −5, |
| −5, 54, 18, −3, | −5, 51, 22, −4, | −4, 53, 18, −3, | −4, 52, 20, −4, | −5, 52, 20, −3, | −4, 53, 18, −3, |
| −5, 52, 20, −3, | −6, 50, 24, −4, | −5, 51, 21, −3, | −4, 50, 22, −4, | −6, 52, 22, −4, | −5, 52, 20, −3, |
| −5, 50, 22, −3, | −6, 49, 26, −5, | −5, 50, 23, −4, | −5, 49, 24, −4, | −6, 50, 24, −4, | −5, 49, 23, −3, |
| −5, 49, 24, −4, | −6, 46, 29, −5, | −6, 49, 25, −4, | −5, 48, 26, −5, | −6, 47, 27, −4, | 5, 41, 16, 2, |
| −6, 47, 27, −4, | −7, 45, 31, −5, | −5, 46, 28, −5, | −5, 45, 29, −5, | −6, 46, 29, −5, | −6, 46, 29, −5, |
| −6, 45, 28, −3, | −7, 44, 33, −6, | −4, 44, 30, −6, | −5, 44, 29, −4, | −6, 44, 31, −5, | −5, 43, 30, −4, |
| −5, 43, 31, −5, | −6, 40, 35, −5, | −5, 41, 32, −4, | −5, 42, 32, −5, | −6, 41, 34, −5, | −5, 43, 31, −5, |
| −5, 40, 34, −5, | −6, 39, 37, −6, | −5, 39, 34, −4, | −5, 40, 34, −5, | −6, 39, 36, −5, | −5, 40, 33, −4, |
| −5, 38, 36, −5, | −6, 35, 40, −5, | −4, 36, 36, −4, | −5, 38, 36, −5, | −6, 37, 38, −5, | −5, 37, 36, −4, |
| −5, 36, 39, −6, | −7, 34, 43, −6, | −5, 34, 40, −5, | −5, 36, 38, −5, | −5, 34, 41, −6, | −5, 34, 39, −4, |
| −5, 33, 41, −5, | −6, 31, 45, −5, | −5, 32, 42, −5, | −5, 34, 40, −5, | −5, 32, 43, −6, | −5, 31, 43, −5, |
| −6, 32, 43, −5, | −6, 30, 46, −6, | −3, 27, 50, −10, | −5, 33, 41, −5, | −5, 30, 45, −6, | −5, 28, 44, −3, |
| −5, 29, 46, −6, | −5, 27, 48, −6, | −4, 27, 46, −5, | −5, 29, 45, −5, | −5, 28, 47, −6, | −5, 29, 46, −6, |
| −5, 27, 48, −6, | −5, 24, 51, −6, | −3, 23, 48, −4, | −5, 27, 47, −5, | −4, 25, 49, −6, | −2, 22, 50, −6, |
| −4, 24, 50, −6, | −5, 22, 52, −5, | −4, 22, 51, −5, | −4, 25, 48, −5, | −4, 23, 50, −5, | −4, 22, 51, −5, |
| −4, 22, 52, −6, | −5, 20, 54, −5, | −3, 20, 52, −5, | −4, 23, 50, −5, | −4, 20, 53, −5, | −4, 21, 52, −5, |
| −3, 19, 53, −5, | −4, 17, 55, −4, | −3, 17, 53, −3, | −4, 19, 53, −4, | −3, 18, 54, −5, | −3, 17, 53, −3, |
| −4, 18, 54, −4, | −4, 15, 57, −4, | −3, 16, 55, −4, | −4, 18, 54, −4, | −3, 16, 56, −5, | −4, 20, 47, 1, |
| −3, 15, 57, −5, | −3, 13, 57, −3, | −3, 15, 56, −4, | −3, 15, 55, −3, | −3, 14, 57, −4, | −3, 15, 56, −4, |
| −3, 13, 58, −4, | −3, 11, 59, −3, | −3, 13, 57, −3, | −3, 13, 57, −3, | −3, 12, 58, −3, | −3, 14, 55, −2, |
| −2, 10, 58, −2, | −2, 8, 60, −2, | −2, 10, 57, −1, | −2, 11, 57, −2, | −2, 10, 58, −2, | −3, 11, 57, −1, |
| −2, 8, 61, −3, | −2, 7, 60, −1, | −2, 8, 60, −2, | −2, 8, 60, −2, | −2, 8, 60, −2, | −2, 8, 60, −2, |
| −1, 5, 62, −2, | −1, 4, 61, 0, | −1, 5, 61, −1, | −1, 6, 60, −1, | −1, 5, 61, −1, | −1, 6, 61, −2, |
| −1, 3, 63, −1 | −1, 3, 62, 0 | −1, 4, 61, 0 | −1, 3, 62, 0 | −1, 3, 62, 0 | −1, 3, 63, −1 |

TABLE 4

DCTIF Filters Continued.

| 4 × 8 | 4 × 16 | 4 × 32 | 8 × 8 | 8 × 16 | 8 × 32 |
|---|---|---|---|---|---|
| 2, 59, 4, −1, | 2, 59, 5, −2, | 2, 59, 4, −1, | 3, 57, 5, −1, | 3, 57, 6, −2, | 2, 60, 3, −1, |
| −1, 61, 5, −1, | 0, 60, 5, −1, | 1, 58, 6, −1, | 1, 58, 7, −2, | 1, 58, 7, −2, | 1, 59, 5, −1, |
| −1, 60, 7, −2, | 0, 58, 8, −2, | 0, 58, 8, −2, | 0, 58, 8, −2, | 1, 56, 9, −2, | 0, 59, 7, −2, |
| −1, 58, 9, −2, | −1, 58, 9, −2, | −1, 57, 10, −2, | −1, 58, 10, −3, | 0, 56, 10, −2, | −1, 58, 9, −2, |
| −2, 57, 11, −2, | −1, 56, 12, −3, | −1, 55, 12, −2, | −1, 56, 12, −3, | −1, 56, 12, −3, | −2, 57, 11, −2, |
| −3, 57, 13, −3, | −2, 56, 13, −3, | −2, 56, 13, −3, | −2, 55, 14, −3, | −1, 54, 14, −3, | −2, 56, 13, −3, |
| −3, 55, 15, −3, | −3, 54, 16, −3, | −3, 54, 16, −3, | −2, 53, 16, −3, | −2, 53, 17, −4, | −3, 55, 15, −3, |
| −4, 54, 17, −3, | −3, 52, 18, −3, | −3, 53, 17, −3, | −3, 53, 18, −4, | −3, 53, 18, −4, | −4, 55, 16, −3, |
| −4, 52, 19, −3, | −3, 51, 19, −3, | −4, 52, 19, −3, | −3, 51, 19, −3, | −3, 51, 20, −4, | −4, 52, 19, −3, |
| −4, 51, 21, −4, | −4, 51, 21, −4, | −4, 50, 22, −4, | −4, 50, 22, −4, | −3, 49, 22, −4, | −4, 51, 21, −4, |
| −6, 50, 23, −3, | −5, 50, 23, −4, | −5, 49, 24, −4, | −4, 48, 24, −4, | −4, 47, 25, −4, | −5, 50, 23, −4, |
| −5, 47, 26, −4, | −5, 48, 26, −5, | −5, 47, 26, −4, | −5, 48, 25, −4, | −5, 46, 26, −4, | −5, 48, 25, −4, |
| −6, 46, 29, −5, | −5, 45, 29, −5, | −5, 45, 28, −4, | −5, 44, 29, −4, | −4, 44, 29, −5, | −5, 46, 28, −5, |
| −4, 42, 31, −5, | −5, 44, 30, −5, | −5, 44, 30, −5, | −4, 41, 32, −5, | −4, 42, 31, −5, | −5, 44, 30, −5, |
| −5, 42, 32, −5, | −5, 42, 32, −5, | −5, 42, 32, −5, | −4, 41, 32, −5, | −4, 40, 33, −5, | −5, 42, 32, −5, |
| −5, 39, 34, −4, | −5, 40, 34, −5, | −5, 40, 34, −5, | −5, 39, 35, −5, | −4, 38, 34, −4, | −5, 40, 34, −5, |
| −5, 36, 38, −5, | −4, 36, 37, −5, | −5, 37, 37, −5, | −4, 36, 37, −4, | −4, 36, 37, −5, | −5, 37, 37, −5, |
| −4, 34, 40, −6, | −5, 34, 40, −5, | −5, 35, 39, −5, | −4, 34, 39, −5, | −4, 34, 39, −5, | −5, 36, 38, −5, |
| −5, 32, 42, −5, | −5, 32, 42, −5, | −5, 33, 41, −5, | −4, 32, 41, −5, | −4, 32, 41, −5, | −5, 34, 40, −5, |
| −3, 30, 43, −6, | −4, 30, 43, −5, | −5, 32, 42, −5, | −5, 32, 41, −4, | −4, 30, 43, −5, | −5, 32, 42, −5, |
| −5, 28, 46, −5, | −4, 28, 45, −5, | −5, 29, 45, −5, | −4, 28, 45, −5, | −4, 28, 44, −4, | −5, 29, 45, −5, |
| −4, 25, 48, −5, | −4, 26, 47, −5, | −5, 27, 47, −5, | −4, 26, 46, −4, | −4, 27, 47, −5, | −5, 27, 47, −5, |
| −4, 23, 51, −6, | −4, 23, 50, −5, | −4, 25, 47, −4, | −3, 23, 48, −4, | −4, 24, 48, −4, | −4, 24, 49, −5, |
| −3, 21, 51, −5, | −3, 21, 50, −4, | −4, 22, 50, −4, | −3, 20, 50, −3, | −4, 22, 50, −4, | −5, 23, 50, −4, |
| −3, 18, 53, −4, | −3, 19, 51, −3, | −4, 20, 52, −4, | −3, 18, 53, −4, | −3, 19, 51, −3, | −4, 20, 52, −4, |
| −3, 16, 55, −4, | −3, 17, 53, −3, | −4, 18, 53, −3, | −3, 17, 53, −3, | −3, 17, 53, −3, | −4, 18, 54, −4, |
| −3, 15, 56, −4, | −3, 15, 55, −3, | −3, 16, 54, −3, | −3, 15, 55, −3, | −3, 16, 53, −2, | −3, 16, 54, −3, |
| −3, 13, 57, −3, | −3, 13, 56, −2, | −3, 14, 56, −3, | −2, 13, 55, −2, | −3, 14, 55, −2, | −3, 14, 56, −3, |
| −3, 11, 58, −2, | −2, 11, 56, −1, | −2, 12, 56, −2, | −2, 11, 56, −1, | −2, 12, 55, −1, | −3, 11, 58, −2, |
| −2, 9, 59, −2, | −2, 9, 58, −1, | −2, 10, 58, −2, | −2, 9, 58, −1, | −2, 10, 56, 0, | −2, 9, 58, −1, |
| −1, 6, 60, −1, | −1, 7, 59, −1, | −2, 7, 60, −1, | −2, 7, 59, 0, | −2, 8, 57, 1, | −2, 7, 59, 0, |
| −1, 5, 61, −1 | −2, 5, 61, 0 | −1, 5, 60, 0 | −2, 6, 59, 1 | −2, 6, 58, 2 | −1, 6, 59, 0 |

TABLE 5

DCTIF Filters Continued.

| 16 × 16 | 16 × 32 | 16 × 64 | 32 × 32 | 64 × 64 |
|---|---|---|---|---|
| 2, 60, 4, −2, | 2, 58, 5, −1, | 0, 59, 6, −1, | 2, 59, 4, −1, | 3, 58, 3, 0, |
| 1, 57, 8, −2, | 1, 58, 6, −1, | 0, 59, 6, −1, | 1, 58, 6, −1, | 1, 59, 3, 1, |
| 0, 57, 9, −2, | 0, 58, 8, −2, | −1, 58, 8, −1, | 0, 58, 8, −2, | 1, 58, 5, 0, |
| −1, 57, 11, −3, | 0, 56, 10, −2, | −2, 58, 9, −1, | −1, 57, 10, −2, | 0, 57, 7, 0, |
| −1, 56, 12, −3, | −1, 56, 12, −3, | −2, 56, 12, −2, | −2, 57, 12, −3, | −1, 56, 10, −1, |
| −2, 55, 14, −3, | −2, 55, 14, −3, | −3, 56, 13, −2, | −2, 56, 13, −3, | −1, 56, 10, −1, |
| −2, 53, 16, −3, | −3, 54, 16, −3, | −3, 54, 15, −2, | −3, 53, 17, −3, | −3, 55, 13, −1, |
| −3, 53, 18, −4, | −3, 52, 18, −3, | −4, 55, 15, −2, | −4, 53, 18, −3, | −4, 55, 14, −1, |
| −4, 52, 20, −4, | −4, 51, 20, −3, | −4, 50, 21, −3, | −4, 52, 20, −4, | −3, 52, 17, −2, |
| −4, 50, 22, −4, | −4, 50, 22, −4, | −5, 50, 22, −3, | −4, 50, 22, −4, | −4, 52, 18, −2, |
| −4, 47, 25, −4, | −4, 48, 24, −4, | −5, 48, 24, −3, | −4, 48, 24, −4, | −4, 49, 21, −2, |
| −5, 46, 27, −4, | −5, 47, 26, −4, | −6, 47, 26, −3, | −5, 46, 27, −4, | −5, 48, 24, −3, |
| −5, 45, 29, −5, | −5, 45, 29, −5, | −6, 45, 28, −3, | −6, 45, 29, −4, | −5, 45, 26, −2, |
| −5, 42, 31, −4, | −5, 43, 30, −4, | −6, 43, 31, −4, | −6, 45, 30, −5, | −4, 43, 28, −3, |
| −5, 41, 33, −5, | −5, 42, 32, −5, | −6, 42, 32, −4, | −5, 40, 34, −5, | −4, 40, 31, −3, |
| −5, 39, 34, −4, | −5, 40, 34, −5, | −6, 40, 34, −4, | −5, 39, 35, −5, | −5, 39, 33, −3, |
| −5, 36, 38, −5, | −5, 37, 37, −5, | −5, 35, 38, −4, | −5, 37, 37, −5, | −4, 37, 35, −4, |
| −4, 35, 38, −5, | −5, 36, 38, −5, | −6, 34, 40, −4, | −5, 35, 39, −5, | −4, 35, 36, −3, |
| −5, 33, 41, −5, | −5, 34, 40, −5, | −5, 32, 41, −4, | −5, 33, 41, −5, | −3, 32, 39, −4, |
| −4, 31, 42, −5, | −5, 32, 42, −5, | −5, 29, 44, −4, | −5, 30, 44, −5, | −3, 29, 42, −4, |
| −5, 28, 46, −5, | −5, 29, 45, −5, | −4, 27, 45, −4, | −5, 29, 45, −5, | −3, 27, 43, −3, |
| −5, 27, 47, −5, | −5, 28, 45, −4, | −4, 25, 47, −4, | −5, 28, 46, −5, | −3, 26, 45, −4, |
| −4, 24, 49, −5, | −5, 25, 48, −4, | −4, 23, 48, −3, | −4, 23, 49, −4, | −3, 21, 49, −3, |
| −4, 23, 50, −5, | −5, 23, 50, −4, | −4, 22, 49, −3, | −4, 21, 51, −4, | −3, 20, 50, −3, |
| −3, 19, 52, −4, | −4, 20, 51, −3, | −3, 17, 52, −2, | −4, 20, 51, −3, | −2, 18, 51, −3, |
| −3, 17, 54, −4, | −4, 18, 53, −3, | −3, 15, 54, −2, | −4, 18, 53, −3, | −2, 16, 52, −2, |
| −3, 16, 54, −3, | −4, 16, 54, −2, | −3, 13, 55, −1, | −4, 16, 54, −2, | −2, 14, 55, −3, |
| −3, 14, 55, −2, | −3, 14, 55, −2, | −3, 12, 56, −1, | −3, 13, 56, −2, | −1, 11, 56, −2, |
| −3, 11, 58, −2, | −3, 11, 57, −1, | −2, 10, 56, 0, | −3, 11, 57, −1, | −2, 10, 56, 0, |
| −2, 9, 58, −1, | −2, 10, 56, 0, | −2, 8, 57, 1, | −2, 9, 58, −1, | −1, 8, 58, −1, |
| −2, 8, 58, 0, | −2, 8, 58, 0, | −2, 7, 58, 1, | −1, 5, 59, 1, | 0, 5, 58, 1, |
| −2, 6, 59, 1 | −2, 6, 59, 1 | −1, 5, 59, 1 | −1, 3, 60, 2 | 0, 4, 59, 1 |

With such optimized DCTIF and SIF filters, the coding gain for All Intra mode is substantial, as shown for example in Table 6.

TABLE 6

Coding Gain Using Example Optimized DCTIF and SIF Filters

| | All Intra Main10 | | |
|---|---|---|---|
| | Y | U | V |
| Class A1 | −0.12% | −0.34% | 0.04% |
| Class A2 | −0.11% | 0.08% | −0.05% |
| Class B | −0.11% | 0.02% | 0.12% |
| Class C | −0.04% | −0.19% | −0.21% |
| Class E | −0.21% | 0.14% | −0.65% |
| Overall | −0.11% | −0.05% | −0.12% |
| Class D | −0.06% | −0.07% | 0.09% |
| Class F | −0.02% | 0.42% | −0.47% |

In some embodiments, instead of using 17 DCTIF filters and 9 SIF filters as shown above, some of the block sizes which have similar filters can be merged to save space. For example, the DCTIF filters for block 1×16, 1×32, 2×8, 2×16, 2×32 could be merged as one filter, etc. In some embodiments, instead of, or in addition to, block size, the DCTIF and SIF filters can be optimized based on other features as well. For example, the filters can be optimized based on angular mode ID, variation of the reference samples, etc.

In some embodiments, instead of using the DCTIF and SIF filters inferred from the optimization framework described above, the electronic device 300 could further analyze the filters from optimization to obtain an intuition about how to define those filters mathematically, to spare the space to save those filters explicitly. For example, the DCTIF weights can be modeled with respect to the existing DCTIF filters $DCTIF_{VVC}$ as follows.

$$DCTIF_{MXN}[i] = DCTIF_{VVC} + (a, b, c, d) \cdot d_{MXN}(i)$$

Here, a+b+c+d=1 and a, b, c, d are the relative offsets to $DCTIF_{VVC}$. An example offset could be (a, b, c, d)=(−1,1, 1,−1). $d_{MXN}(i)$ can be either the same or different for the 32-pel positions.

In some embodiments, instead of using a unique set of DCTIF filters and SIF filters for each block size, the features derived from the reference samples can be used, such as the variation of the reference samples, to determine which sets of DCTIF and SIF filters to use or how to adjust the DCTIF and SIF filters correspondingly. For instance, a variance or smoothness metric can be calculated for the reference samples. Based on a variance/smoothness metric, the electronic device 300 can either map the variation metric to the index of a filter set or determine the offsets/adjustment to be applied to the filters to enhance the coding efficiency.

In some embodiments, the electronic device 300 can determine which set of filters to use or how to adjust the filter weights based on neighboring information for the reference samples. For example, either a majority of filters used in the particular neighborhood can be used, or a blending of the filters of some commonly used filters in the neighborhood can be performed.

Additionally or alternatively, in some embodiments, template matching could be used to find similar blocks in a predefined region. The block can directly apply the filters which is used by the most matched block or blend the filters of the top matched blocks. In some embodiments, the weights may be slightly adjusted based on the difference of the matching metric with the template block/blocks. In some embodiments, the various schemes above to customize DCTIF filters and SIF filters for a block can be mixed together. In some embodiments, different DCTIF and SIF filters can be used based on whether a multiple reference line mode is selected for the block or not.

At step 620, whether a DCTIF filter or a SIF filter was used, PDPC, such as described with respect to FIG. 5, is applied and an angular prediction is output. It will be understood that multiple angular predictions can be performed to output a predicted block. In some embodiments, when performed as part of an encoding process, the process 600 can use a predicted block to determine a prediction residual between the predicted block and the original block, and can include the residual as part of an encoded bitstream to be transmitted to a decoding device. In some embodiments, when performed as part of a decoding process, the process 600 can determine predicted blocks as part of a video reconstruction process to predict a plurality of blocks used to reconstruct the video.

Although FIG. 6 illustrates an example process 600 for block-based reference sample interpolation optimization, various changes may be made to FIG. 6. For example, while shown as a series of steps, various steps in FIG. 6 may overlap, occur in parallel, or occur any number of times.

Figure 7:
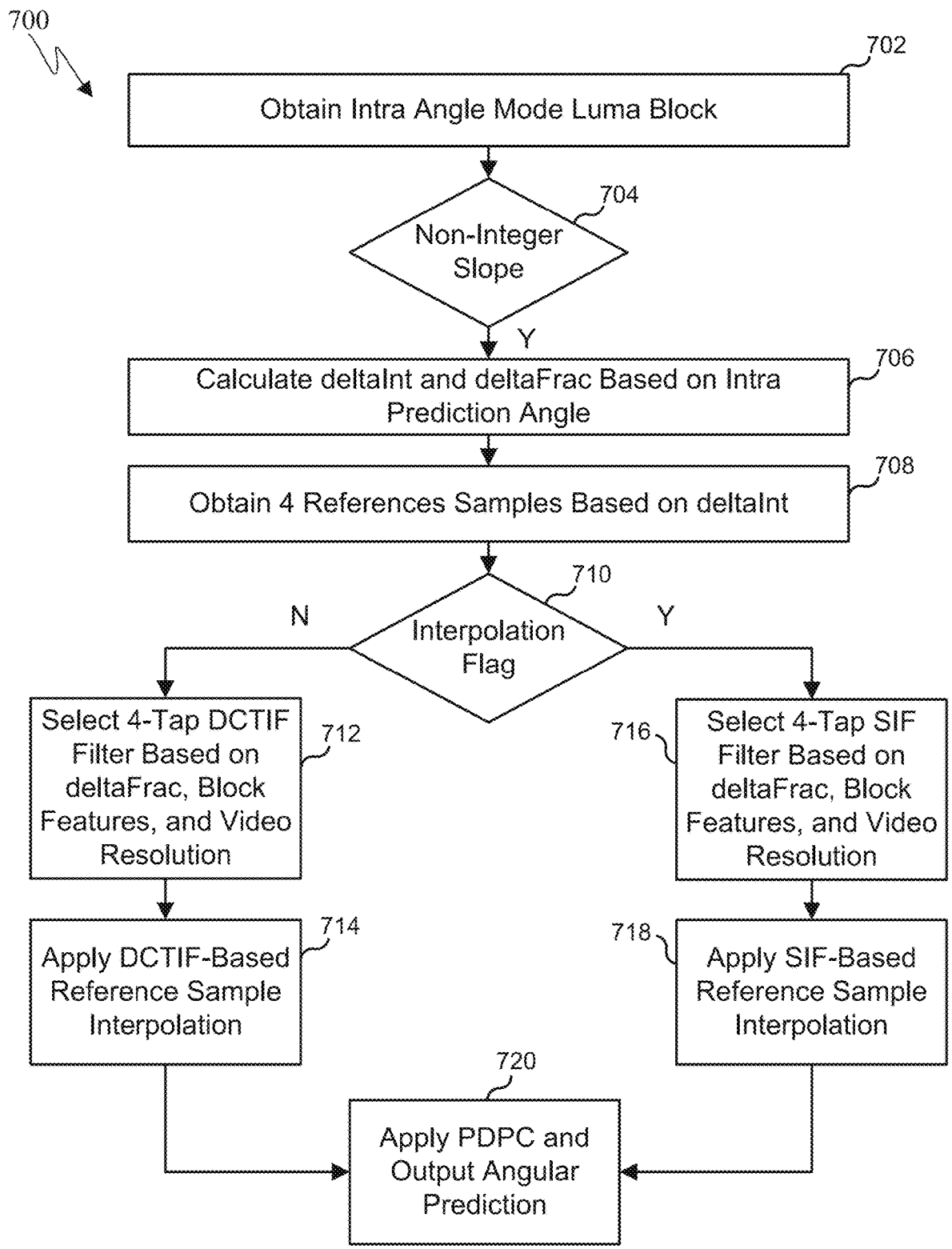
FIG. 7 illustrates an example process for block-based reference sample interpolation optimization based on video resolution in accordance with this disclosure.

FIG. 7 illustrates an example process 700 for block-based reference sample interpolation optimization based on video resolution in accordance with this disclosure. For ease of explanation, the process 700 of FIG. 7 may be described as being performed using the electronic device 300 of FIG. 3. However, the process 700 may be used with any other suitable system and any other suitable electronic device.

The process 700 begins similarly to the process 600 in order to obtain the reference samples to use for the intra angle prediction. As shown in FIG. 7, at step 702, the electronic device 300 obtains an intra angle mode luma block. At step 704, the electronic device 300 determines whether the angle has a non-integer slope. If so, this indicates that a non-integer slope mode is to be used, and, at step 706, the electronic device calculates deltaInt and deltaFrac based on the intra prediction angle used. As described with respect to FIG. 4, deltaInt and deltaFrac are used to determined which reference sample(s) to use for interpolation of a particular pixel, where deltaInt is the closest left-side integer position of a predicted sample projection within the reference samples, and deltaFrac is the fractional part of the predicted sample projection.

At step 708, the electronic device 300 obtains four reference samples based on the calculated deltaInt. At step 710, the electronic device 300 determines whether an interpolation flag is set to true or false (e.g., a value of 1 or 0). If the interpolation flag is false, the process 700 moves to step 712. At step 712, a 4-tap DCTIF filter is selected based on the calculated deltaFrac, block features of the luma block, and the video resolution associated with the block. At step 714, the selected DCTIF filter is applied on the reference samples to perform interpolation on the reference samples. If, at step 710, the electronic device 300 determines the interpolation flag is set to true, the process 700 moves to step 716. At step 716, a 4-tap SIF filter is selected based on the calculated deltaFrac, block features of the luma block, and the video resolution associated with the block. At step 718, the selected SIF filter is applied on the reference samples to perform interpolation on the reference samples.

Any of the block features described with respect to FIG. 6 can be used in the process 700 to influence the selection of the interpolation filters at steps 712 and 716. Additionally, as shown in FIG. 7, video resolution can also influence the selection of the interpolation filters at steps 712 and 716. That is, to further improve the coding efficiency, different sets of DCTIF filters and SIF filters for different video resolutions can be used. It has been found that higher resolution video tends to have smaller differences in variance and smoothness between reference samples, whereas lower resolution videos tend to have higher differences in variance and smoothness between reference samples. Therefore, the interpolation filters used, whether they be DCTIF or SIF filters, can be customized and optimized based on the video resolution to improve coding efficiency.

By using different sets of DCTIF and SIF filters for the video with different resolutions, the coding gain for All Intra mode can be improved, as shown in Table 7.

TABLE 7

Coding Gain for Block-size and Video resolution-based Reference sample Interpolation

| | All Intra Main10 | | |
|---|---|---|---|
| | Y | U | V |
| Class A1 | −0.12% | −0.34% | 0.04% |
| Class A2 | −0.11% | 0.08% | −0.05% |
| Class B | −0.14% | 0.03% | 0.13% |
| Class C | −0.10% | −0.30% | −0.19% |
| Class E | −0.26% | −0.12% | −0.70% |
| Overall | −0.14% | −0.12% | −0.13% |
| Class D | −0.20% | 0.01% | 0.12% |
| Class F | 0.01% | 0.60% | −0.06% |

At step 720, whether a DCTIF filter or a SIF filter was used, PDPC, such as described with respect to FIG. 5, is applied and an angular prediction is output. It will be understood that multiple angular predictions can be performed to output a predicted block. In some embodiments, when performed as part of an encoding process, the process 700 can use a predicted block to determine a prediction residual between the predicted block and the original block, and can include the residual as part of an encoded bitstream to be transmitted to a decoding device. In some embodiments, when performed as part of a decoding process, the process 700 can determine predicted blocks as part of a video reconstruction process to predict a plurality of blocks used to reconstruct the video.

Although FIG. 7 illustrates an example process 700 for block-based reference sample interpolation optimization based on video resolution, various changes may be made to FIG. 7. For example, while shown as a series of steps, various steps in FIG. 7 may overlap, occur in parallel, or occur any number of times.

Figure 8:
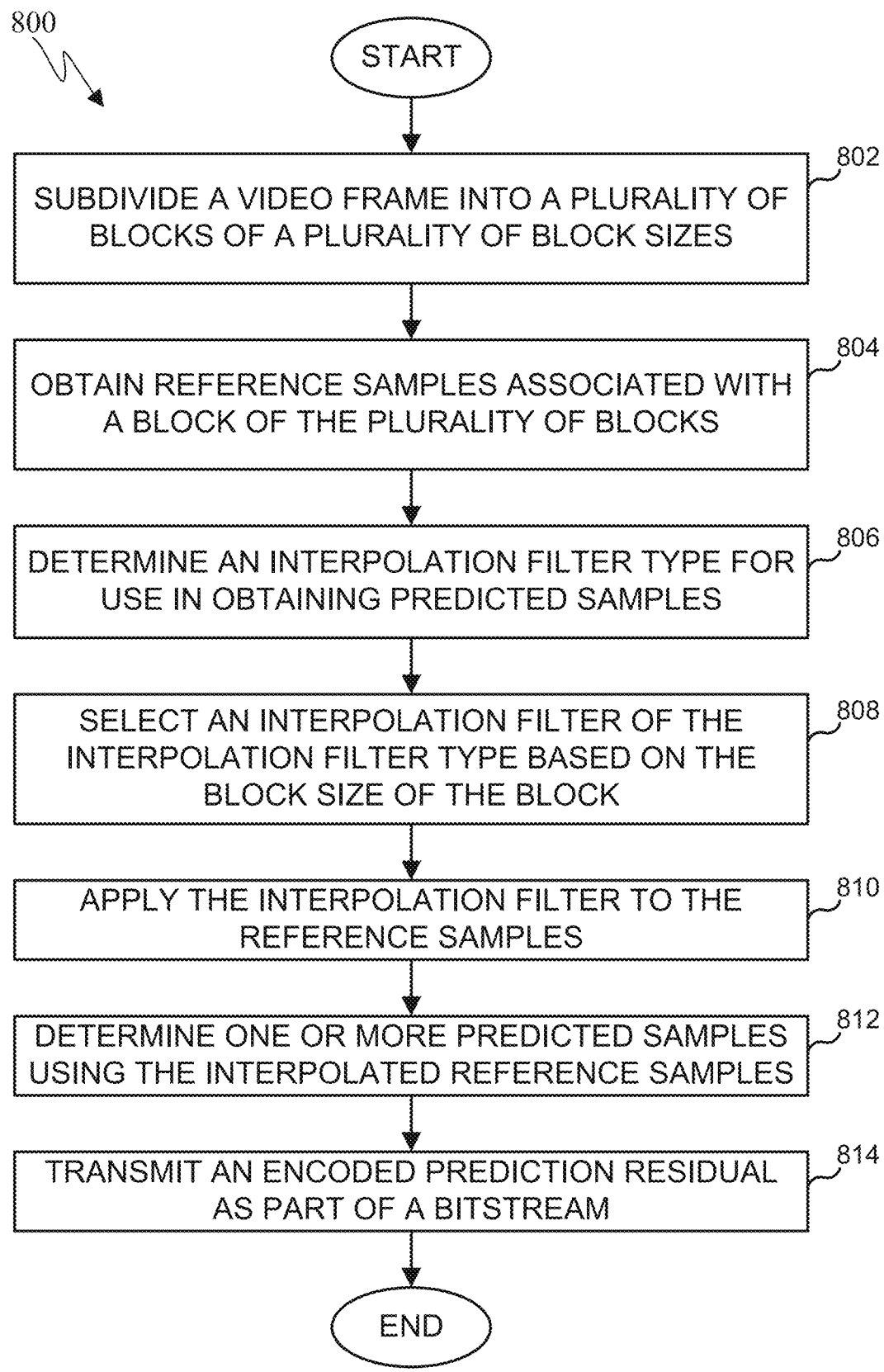
FIG. 8 illustrates an example encoding method using block-based reference sample interpolation filter optimization in accordance with this disclosure.

FIG. 8 illustrates an example encoding method 800 using block-based reference sample interpolation filter optimization in accordance with this disclosure. For ease of explanation, the method 800 of FIG. 8 is described as being performed using a processor of the electronic device 300 of FIG. 3. However, the method 800 may be used with any other suitable system and any other suitable electronic device.

As shown in FIG. 8, at step 802, the electronic device 300 subdivides a video frame into a plurality of blocks of a plurality of block sizes. At step 804, the electronic device 300 obtains reference samples associated with a block of the plurality of blocks, such as described with respect to FIG. 6. At step 806, the electronic device 300 determines an interpolation filter type for use in obtaining predicted samples. For example, as also described with respect to FIG. 6, the interpolation filter type can be selected based on a value of an interpolation flag, such as selecting a DCTIF interpolation filter type or a SIF interpolation filter type.

At step 808, the electronic device 300 selects an interpolation filter of the interpolation filter type based on the block size of the block. As described with respect to FIG. 6, the interpolation filter selected can be a DCTIF or SIF filter that is customized and/or optimized based on block features such as the block size. In some embodiments, the interpolation filter can be associated with multiple block sizes, such that a filter can be used for more than one block size.

In some embodiments, such as described with respect to FIG. 6, the interpolation filter can be optimized using a loss function based on the prediction residual, where a sum of losses, determined using the loss function, of multiple blocks with a same size as the block size of the plurality of blocks is minimized to obtain the interpolation filter. In some embodiments, such as described with respect to FIG. 6, the interpolation filter can be selected based on a model in which weights of the interpolation filter are derived using offset values and a default interpolation filter. In some embodiments, such as described with respect to FIG. 6, the interpolation filter can be further based on one or more other features including at least one of an angular mode identifier or variation data of the reference samples.

In some embodiments, such as described with respect to FIG. 6, the interpolation filter can be further selected based on interpolation filters associated with one or more neighboring blocks of the block of the video frame. In some embodiments, such as described with respect to FIG. 6, the interpolation filter can be further selected based on interpolation filters associated with similar blocks to the block of the video frame determined using template matching in a predefined region of the video frame. In some embodiments, such as described with respect to FIG. 7, the interpolation filter can be further selected based on a video resolution of the video frame.

At step 810, the electronic device 300 applies the interpolation filter to the reference samples. At step 812, the electronic device 300 determines one or more predicted samples using the interpolated reference samples. At step 814, the electronic device 300 transmits an encoded prediction residual as part of a bitstream, where the prediction residual is a difference between an original block and a predicted block. The electronic device 300 can compress and transmit the output bitstream to an external device or to a storage on the electronic device 300. In various embodiments, the prediction residual can be used by a decoding device in performing intra prediction.

Although FIG. 8 illustrates one example encoding method 800 for block-based reference sample interpolation filter optimization, various changes may be made to FIG. 8. For example, while shown as a series of steps, various steps in FIG. 8 may overlap, occur in parallel, or occur any number of times.

Figure 9:
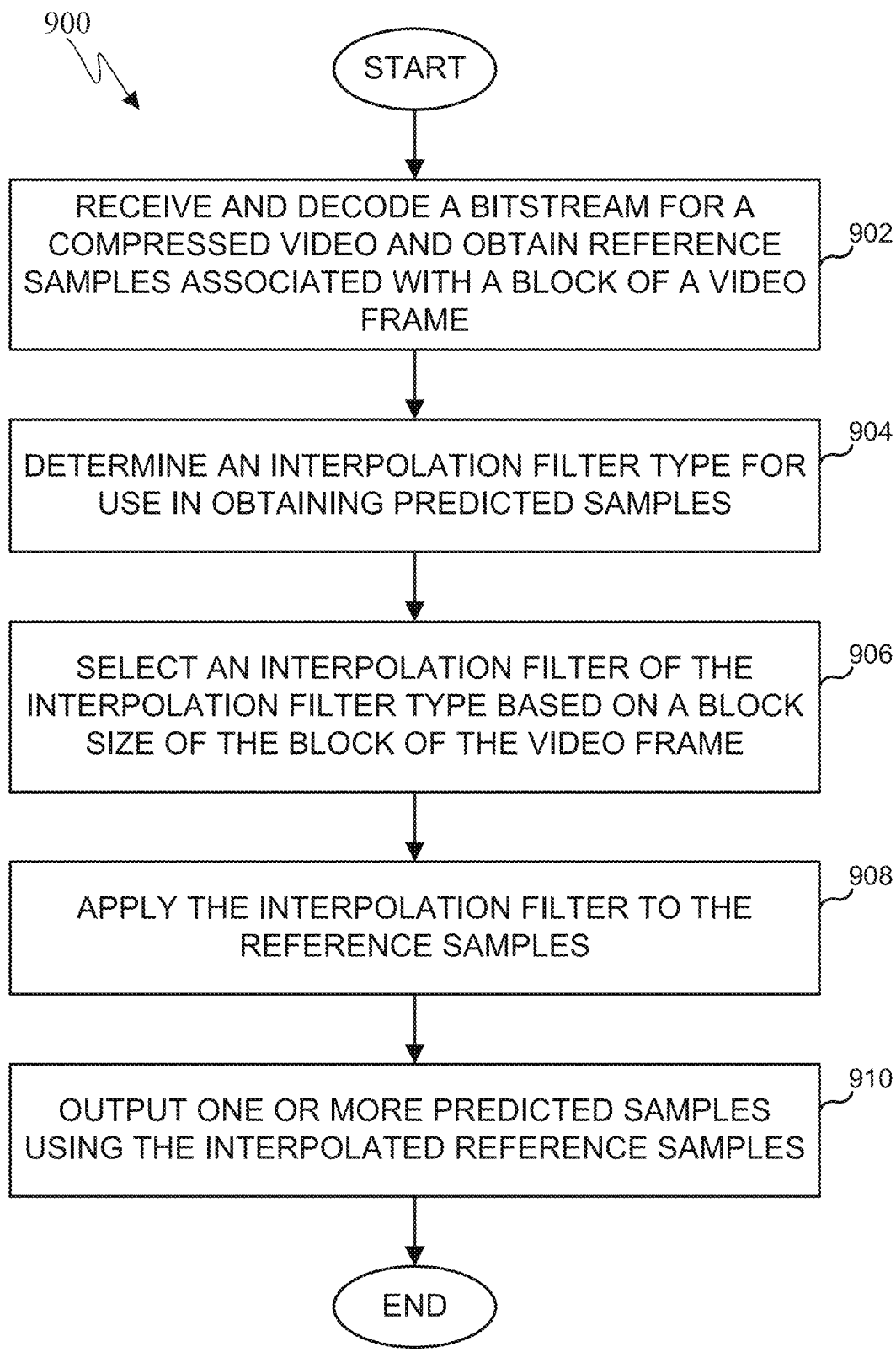
FIG. 9 illustrates an example decoding method using block-based reference sample interpolation filter optimization in accordance with this disclosure.

FIG. 9 illustrates an example decoding method 900 using block-based reference sample interpolation filter optimization in accordance with this disclosure. For ease of explanation, the method 900 of FIG. 9 is described as being performed using a processor of the electronic device 300 of FIG. 3. However, the method 900 may be used with any other suitable system and any other suitable electronic device.

As shown in FIG. 9, at step 902, the electronic device 300 receives a bitstream for a compressed video and the processor of the electronic device 300 decodes the bitstream for the compressed video. As part of the decoding of the bitstream, the electronic device 300 can obtain reference samples associated with a block of a video frame. At step 904, the electronic device 300 determines an interpolation filter type for use in obtaining predicted samples. For example, as also described with respect to FIG. 6, the interpolation filter type can be selected based on a value of an interpolation flag, such as selecting a DCTIF interpolation filter type or a SIF interpolation filter type. At step 906, the electronic device 300 selects an interpolation filter of the interpolation filter type based on a block size of the block of the video frame. As described with respect to FIG. 6, the interpolation filter selected can be a DCTIF or SIF filter that is customized and/or optimized based on block features such as the block size.

In some embodiments, such as described with respect to FIG. 6, the interpolation filter can be associated with multiple block sizes, such that a filter can be used for more than one block size. In some embodiments, such as described with respect to FIG. 6, the interpolation filter can be optimized using a loss function based on a prediction residual, where the prediction residual is a difference between an original block and a predicted block, and where a sum of losses, determined using the loss function, for a plurality of blocks with a same size as the block size of the block of the video frame is minimized to obtain the interpolation filter.

In some embodiments, such as described with respect to FIG. 6, the interpolation filter can be further based on one or more other features including at least one of an angular mode identifier or variation data of the reference samples. In some embodiments, such as described with respect to FIG. 6, the interpolation filter can be selected based on a model in which weights of the interpolation filter are derived using offset values and a default interpolation filter. In some embodiments, such as described with respect to FIG. 6, the interpolation filter can be further selected based on interpolation filters associated with one or more neighboring blocks of the block of the video frame. In some embodiments, such as described with respect to FIG. 6, the interpolation filter can be further selected based on interpolation filters associated with similar blocks to the block of the video frame determined using template matching in a predefined region of the video frame. In some embodiments, such as described with respect to FIG. 7, the interpolation filter can be further selected based on a video resolution of the video frame.

At step 908, the electronic device 300 applies the interpolation filter to the reference samples. At step 910, the electronic device 300 outputs one or more predicted samples using the interpolated reference samples. During decoding of the bitstream and based on the predicted samples and blocks constructed by the electronic device 300, the processor of the electronic device 300 can instruct a display of at least one image of the reconstructed video.

Although FIG. 9 illustrates one example decoding method 900 for block-based reference sample interpolation filter optimization, various changes may be made to FIG. 9. For example, while shown as a series of steps, various steps in FIG. 9 may overlap, occur in parallel, or occur any number of times.

Although the present disclosure has been described with exemplary embodiments, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. An apparatus comprising:
   a communication interface configured to receive a bitstream for a compressed video; and
   a processor operably coupled to the communication interface, the processor configured to:
      decode the bitstream for the compressed video and obtain reference samples associated with a block of a video frame;
      determine an interpolation filter type for use in obtaining predicted samples;
      select an interpolation filter of the interpolation filter type based on a block size of the block of the video frame;
      apply the interpolation filter to the reference samples; and
      output one or more predicted samples using the interpolated reference samples.

2. The apparatus of claim 1, wherein the interpolation filter is optimized using a loss function based on a prediction residual, and wherein the prediction residual is a difference between an original block and a predicted block, and wherein a sum of losses, determined using the loss function, for a plurality of blocks with a same size as the block size of the block of the video frame is minimized to obtain the interpolation filter.

3. The apparatus of claim 1, wherein the interpolation filter is associated with multiple block sizes.

4. The apparatus of claim 1, wherein the interpolation filter is further based on one or more other features including at least one of an angular mode identifier or variation data of the reference samples.

5. The apparatus of claim 1, wherein the interpolation filter is selected based on a model in which weights of the interpolation filter are derived using offset values and a default interpolation filter.

6. The apparatus of claim 1, wherein the interpolation filter is further selected based on interpolation filters associated with one or more neighboring blocks of the block of the video frame.

7. The apparatus of claim 1, wherein the interpolation filter is further selected based on interpolation filters associated with similar blocks to the block of the video frame determined using template matching in a predefined region of the video frame.

8. The apparatus of claim 1, wherein the interpolation filter is further selected based on a video resolution of the video frame.

9. A method comprising:
   receiving a bitstream for a compressed video;
   decoding the bitstream for the compressed video and obtaining reference samples associated with a block of a video frame;
   determining an interpolation filter type for use in obtaining predicted samples;
   selecting an interpolation filter of the interpolation filter type based on a block size of the block of the video frame;
   applying the interpolation filter to the reference samples; and
   outputting one or more predicted samples using the interpolated reference samples.

10. The method of claim 9, wherein the interpolation filter is optimized using a loss function based on a prediction residual, and wherein the prediction residual is a difference between an original block and a predicted block, and wherein a sum of losses, determined using the loss function, for a plurality of blocks with a same size as the block size of the block of the video frame is minimized to obtain the interpolation filter.

11. The method of claim 9, wherein the interpolation filter is associated with multiple block sizes.

12. The method of claim 9, wherein the interpolation filter is further based on one or more other features including at least one of an angular mode identifier or variation data of the reference samples.

13. The method of claim 9, wherein the interpolation filter is selected based on a model in which weights of the interpolation filter are derived using offset values and a default interpolation filter.

14. The method of claim 9, wherein the interpolation filter is further selected based on interpolation filters associated with one or more neighboring blocks of the block of the video frame.

15. The method of claim 9, wherein the interpolation filter is further selected based on interpolation filters associated with similar blocks to the block of the video frame determined using template matching in a predefined region of the video frame.

16. The method of claim 9, wherein the interpolation filter is further selected based on a video resolution of the video frame.

17. An apparatus comprising:
   a communication interface; and
   a processor operably coupled to the communication interface, the processor configured to:
      subdivide a video frame into a plurality of blocks of a plurality of block sizes;
      obtain reference samples associated with a block of the plurality of blocks;
      determine an interpolation filter type for use in obtaining predicted samples;
      select an interpolation filter of the interpolation filter type based on the block size of the block;
      apply the interpolation filter to the reference samples;
      determine one or more predicted samples using the interpolated reference samples; and
      transmit an encoded prediction residual as part of a bitstream, wherein the prediction residual is a difference between an original block and a predicted block.

18. The apparatus of claim 17, wherein the interpolation filter is optimized using a loss function based on the prediction residual and wherein a sum of losses, determined using the loss function, of multiple blocks with a same size as the block size of the plurality of blocks is minimized to obtain the interpolation filter.

19. The apparatus of claim 17, wherein the interpolation filter is selected based on a model in which weights of the interpolation filter are derived using offset values and a default interpolation filter.

20. The apparatus of claim 17, wherein the interpolation filter is further selected based on a video resolution of the video frame.

* * * * *